United States Patent [19]
Katayama et al.

[11] Patent Number: 5,530,685
[45] Date of Patent: Jun. 25, 1996

[54] MAGNETO-OPTICAL RECORDING APPARATUS HAVING PAIRED DEVICES FOR APPLYING EXTERNAL MAGNETIC FIELDS

[75] Inventors: Hiroyuki Katayama, Sakura; Junichiro Nakayama; Michinobu Mieda, both of Shiki-gun; Junji Hirokane; Akira Takahashi, both of Nara; Kenji Ohta, Kitakatsuragi-gun, all of Japan

[73] Assignee: Sharp Kabushiki Kaisha, Japan

[21] Appl. No.: 330,744

[22] Filed: Oct. 28, 1994

[30] Foreign Application Priority Data

Nov. 5, 1993 [JP] Japan .................... 5-277097

[51] Int. Cl.⁶ .................................. G11B 11/00
[52] U.S. Cl. .............................. 369/13; 360/114
[58] Field of Search ........................ 369/13, 14, 110; 360/114, 59; 365/122

[56] References Cited

U.S. PATENT DOCUMENTS

| | | | |
|---|---|---|---|
| 4,825,428 | 4/1989 | Toki | 369/13 |
| 5,025,430 | 6/1991 | Takokoro et al. | 369/13 |
| 5,434,844 | 7/1995 | Miyamoto et al. | 369/275.2 |

FOREIGN PATENT DOCUMENTS 01184645  7/1989  Japan .

OTHER PUBLICATIONS

"Direct Overwrite by Light Power Modulation on Magneto-Optical Multi-Layered Media" Jun Saito et al, Proc. Int. Sump. on Optical Memory, 1987, Japanese Journal of Applied Physics, vol. 26 (1987) Supplement 26–4, pp. 155–159.

"Recording Power Characteristics of 130 mm Overwritable MO Disby by Laser Power Modulation Method" (Haruhisa IIDA et al, Proc.Int.Symp.on Optical Memory, 1989, Japanese Journal of Applied Physics, vol. 28(1989)Suppl 26–4, pp. 155–159.

"Direct Overwriting Using Magnetooptical Trilayer Medium and One Magnet" Junichiro Nakayama et al, Jpn. J. Appl. Phys. vol. 32(1993) pp. 5439–5440, Part 1, No 11B, Nov. 1993.

Primary Examiner—Tan Dinh
Attorney, Agent, or Firm—Nixon & Vanderhye

[57] ABSTRACT

A magneto-optical recording apparatus of the present invention is provided with an objective lens for focusing a light beam onto a magneto-optical recording medium. A pair of magnets is disposed on opposite sides of the magneto-optical recording medium and apply a writing magnetic field onto a portion of the magneto-optical recording medium that has been irradiated by the light beam while applying an initializing magnetic field greater than the writing magnetic field onto a portion apart from that irradiated by the light beam.

20 Claims, 13 Drawing Sheets

ROTATION DIRECTION OF DISK

MAGNETO-OPTICAL RECORDING APPARATUS HAVING PAIRED DEVICES FOR APPLYING EXTERNAL MAGNETIC FIELDS

FIELD OF THE INVENTION

The present invention relates to a magneto-optical recording apparatus for recording information on a magneto-optical recording medium such as a magneto-optical disk.

BACKGROUND OF THE INVENTION

Recently, magneto-optical memory devices such as magneto-optical disks have received much attention as memory devices having great densities and large capacities that are capable of rewriting information. For use in computers, large-capacity magneto-optical disks of 5-inch type and 3.5-inch type have already been put on the market.

In these first-generation magneto-optical disks, upon rewriting data, new data is recorded after the previous data has been erased. For this reason, it is necessary to invert the direction of an externally applied auxiliary magnetic field depending on the recording operation and erasing operation.

Among the magneto-optical memory devices, those which are capable of light-modulation overwriting have been demanded year after year because they make it possible to rewrite information without erasing former information, to enable double-sided recording, and to be easily adapted for use in multi-beam operation.

Here, in Jpn. J. Appl. Phys., Vol. 26(1987) Suppl. p. 155–159, a magneto-optical memory device capable of light-modulation overwriting, which has a recording layer and an auxiliary layer that are constituted of perpendicularly polarized magnetic films, has been introduced. In the case of rewriting data, after aligning the magnetization of the auxiliary layer to one direction by using a magnet for initialization use, a light beam whose intensity is modulated according to the data is projected while an auxiliary magnetic field is being applied from a magnet for recording use.

In this conventional arrangement, however, since a large, magnetic-field intensity ranging from 400 to 500 kA/m is required for the initialization, a large magnet has to be prepared for the initialization; this results in an adverse effect on making the magneto-optical disk apparatus more compact and thinner.

SUMMARY OF THE INVENTION

It is an objective of the present invention to provide a magneto-optical recording apparatus having a more compact, thinner construction.

In order to achieve the above objective, a magneto-optical recording apparatus of the present invention is provided with: an objective lens for focusing a light beam onto a magneto-optical recording medium; and a pair of external-magnetic-field applying means (for example, permanent magnets) which are disposed on the respective sides of the magneto-optical recording medium and which apply a writing magnetic field onto a portion of the magneto-optical recording medium that has been irradiated by the light beam while applying an initializing magnetic field onto a portion apart from the portion irradiated by the light beam. Further, the paired external-magnetic-field applying means are arranged so that each line of magnetic flux going from the N-pole to S-pole between field applying means is virtually parallel to the magneto-optical recording medium and the lines of magnetic flux going from the N-pole to S-pole are antiparallel to each other.

With this arrangement, the paired external-magnetic-field applying means virtually form a closed magnetic circuit. For this reason, it becomes possible to utilize the magnetic flux from the external-magnetic-field applying means effectively. This makes it possible to miniaturize the external-magnetic-field applying means. Therefore, the magneto-optical recording apparatus, which allows light-modulation overwriting, can be made more compact and thinner.

Moreover, another magneto-optical recording apparatus of the present invention is provided with: an objective lens for focusing a light beam onto a magneto-optical recording medium; a pair of external-magnetic-field applying means which are disposed on the respective sides of the magneto-optical recording medium and which apply a writing magnetic field and an erasing magnetic field onto a portion of the magneto-optical recording medium that has been irradiated by the light beam; and a shifting means for shifting the external-magnetic-field applying means in parallel with the magneto-optical recording means so as to switch the writing magnetic field and the erasing magnetic field. Here, the paired external-magnetic-field applying means are arranged so that each flux line going from a N-pole to a S-pole between field applying means is virtually parallel to the magneto-optical recording medium and the flux lines going from an N-pole to an S-pole between field applying means are antiparallel to each other.

With this arrangement, the paired external-magnetic-field applying means virtually forms a closed magnetic circuit. For this reason, it becomes possible to utilize the magnetic flux from the external-magnetic-field applying means effectively. This makes it possible to miniaturize the external-magnetic-field applying means. Therefore, the magneto-optical recording apparatus, which allows light-modulation overwriting and wherein a commonly used magneto-optical recording medium without having an auxiliary layer is employed, can be made more compact and thinner.

Furthermore, still another magneto-optical recording apparatus of the present invention is provided with: an objective lens for focusing a light -beam onto a magneto-optical recording medium; and a pair of external-magnetic-field applying means which are disposed on one side of the magneto-optical recording medium and which apply a writing magnetic field onto a portion of the magneto-optical recording medium that has been irradiated by the light beam while applying an initializing magnetic field onto a portion apart from the portion irradiated by the light beam. Here, the paired external-magnetic-field applying means are arranged so that: flux lines going from the N-pole of one field applying device to the S-pole of the other field applying device of a field applying device pair are virtually parallel to the magneto-optical recording medium; the lines going from the N-pole to S-pole between field applying devices (means) are antiparallel to each other; and they are aligned symmetrically with respect to an axis that passes through the portion irradiated by the light beam and is perpendicular to the magneto-optical recording medium.

With this arrangement, a combined magnetic field from the paired external-magnetic-field applying means is applied to the magneto-optical recording medium as a writing magnetic field. This makes it possible to miniaturize the external-magnetic-field applying means, thereby allowing the external-magnetic-field applying means to be located apart from the portion irradiated by the light beam. Therefore, the magneto-optical recording apparatus, which allows light-modulation overwriting, can be made more compact and thinner. Furthermore, the leakage magnetic field from the external-magnetic-field applying means has a uniform distribution in the proximity of the objective lens; therefore, even if an actuator, which magnetically drives the objective lens for tracking and focusing, is installed, the leakage magnetic field hardly gives adverse effects on the actuator.

For a fuller understanding of the nature and advantages of the invention, reference should be made to the ensuing detailed description taken in conjunction with the accompanying drawings.

DESCRIPTION OF THE EMBODIMENTS

Referring to FIGS. 1(a) through 10, the following description will discuss the first embodiment of the present invention.

Figure 1A:
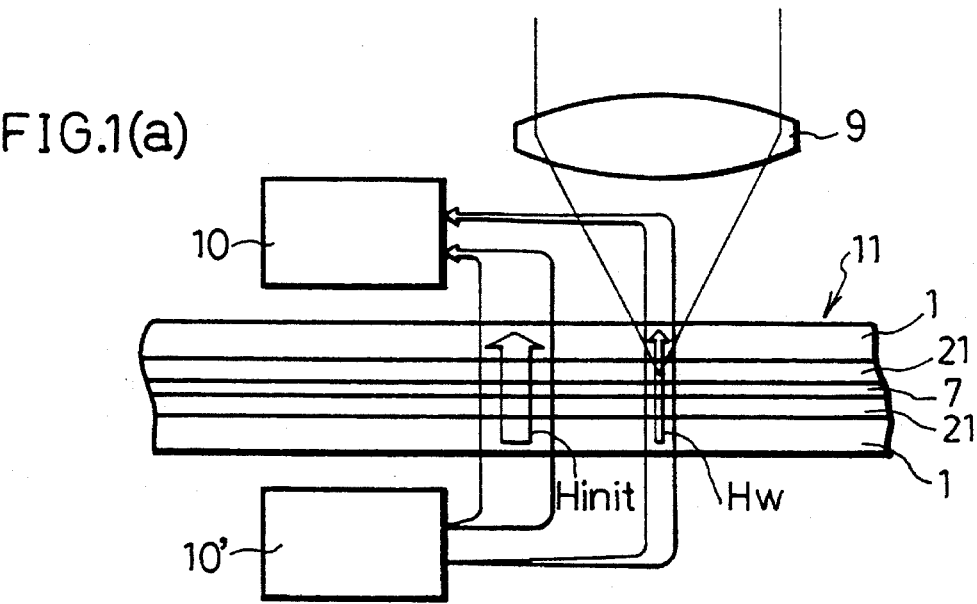
FIGS. 1(a), 1(b) and 1(c), which show the first embodiment of the present invention, are a vertical cross-sectional view, a plan view, and a perspective view that schematically indicate a construction of a magneto-optical disk apparatus.
Figure 1B:
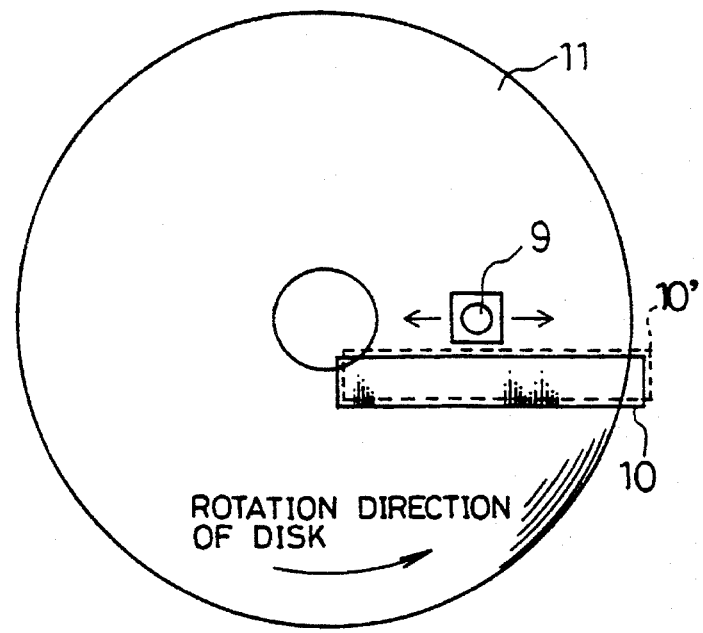
Figure 1C:
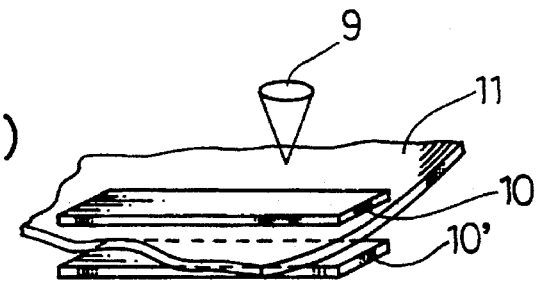

FIGS. 1(a), 1(b) and 1(c) respectively show a vertical cross-sectional view, a plan view and a perspective view of a magneto-optical disk apparatus (magneto-optical recording apparatus) of the present embodiment.

The magneto-optical disk apparatus is mainly provided with: an objective lens 9 for converging a light beam to a magneto-optical recording layer 21 of a magneto-optical disk (magneto-optical recording medium); and magnets 10 and 10' (external-magnetic-field applying means) which are disposed on the respective sides of the magneto-optical disk 11 and which generate an initializing magnetic field ($H_{init}$) and a writing magnetic field ($H_w$).

As illustrated in FIG. 1(b), the magnets 10 and 10', which are disposed on this side before a portion to be irradiated by the light beam with respect to the rotation direction of the magneto-optical disk 11, are arranged so that the magnetizations of the magnets 10 and 10' have opposite directions to each other, and are virtually parallel to the surfaces of the magneto-optical disk 11. With this arrangement, the magnetic field $H_{init}$ that is perpendicular to the magneto-optical disk 11 is applied before the portion to be irradiated by the light beam with respect to the rotation direction of the magneto-optical disk 11, while the magnetic field $H_w$, which is virtually parallel to $H_{init}$ and weaker than $H_{init}$, is applied to the portion irradiated by the light beam.

In the above-mentioned arrangement, the magnetic fields $H_{init}$ and $H_w$, which have a perpendicular upward direction, are applied to the magneto-optical disk 11 from the magnets 10 and 10'. Since the magnets 10 and 10' are disposed on the respective sides of the magneto-optical disk 11 so that the magnetizations of the magnets 10 and 10' have opposite directions to each other, the magnets 10 and 10' virtually form a closed magnetic circuit. For this reason, it is possible to obtain a strong magnetic field $H_{init}$ even in the case of using small magnets for the magnets 10 and 10'. This makes it possible to miniaturize the magneto-optical disk apparatus. Moreover, since the magnets 10 and 10' are disposed so that the magnetizations of the magnets 10 and 10' are virtually parallel to the surfaces of the magneto-optical disk 11, it becomes possible to make the magnet-optical disk apparatus thinner. Furthermore, it is possible to apply not only $H_{init}$, but also $H_w$, merely by using the magnets 10 and 10'.

For example, permanent magnets of a Nd containing material having a density of residual magnetic flux of 1.21 T are used as the magnets 10 and 10'. The size of the magnets 10 and 10' is in the order of 10 mm in width along the radius of the magneto-optical disk 11, 20 mm in length along the track of the magneto-optical disk 11, and 2 mm in thickness.

When these magnets 10 and 10' were set at positions 0.5 mm apart from the substrates 1 of a magneto-optical disk 11 having a thickness of 1.2 mm, that is, at positions 1.7 mm apart from a recording-medium layer 21, as well as 4 mm apart from a light-beam spot, a magnetic field $H_{init}$ of 2.5 kOe, as well as a magnetic field $H_w$ of 500 Oe, was applied to the magneto-optical disk 11.

Figure 2:
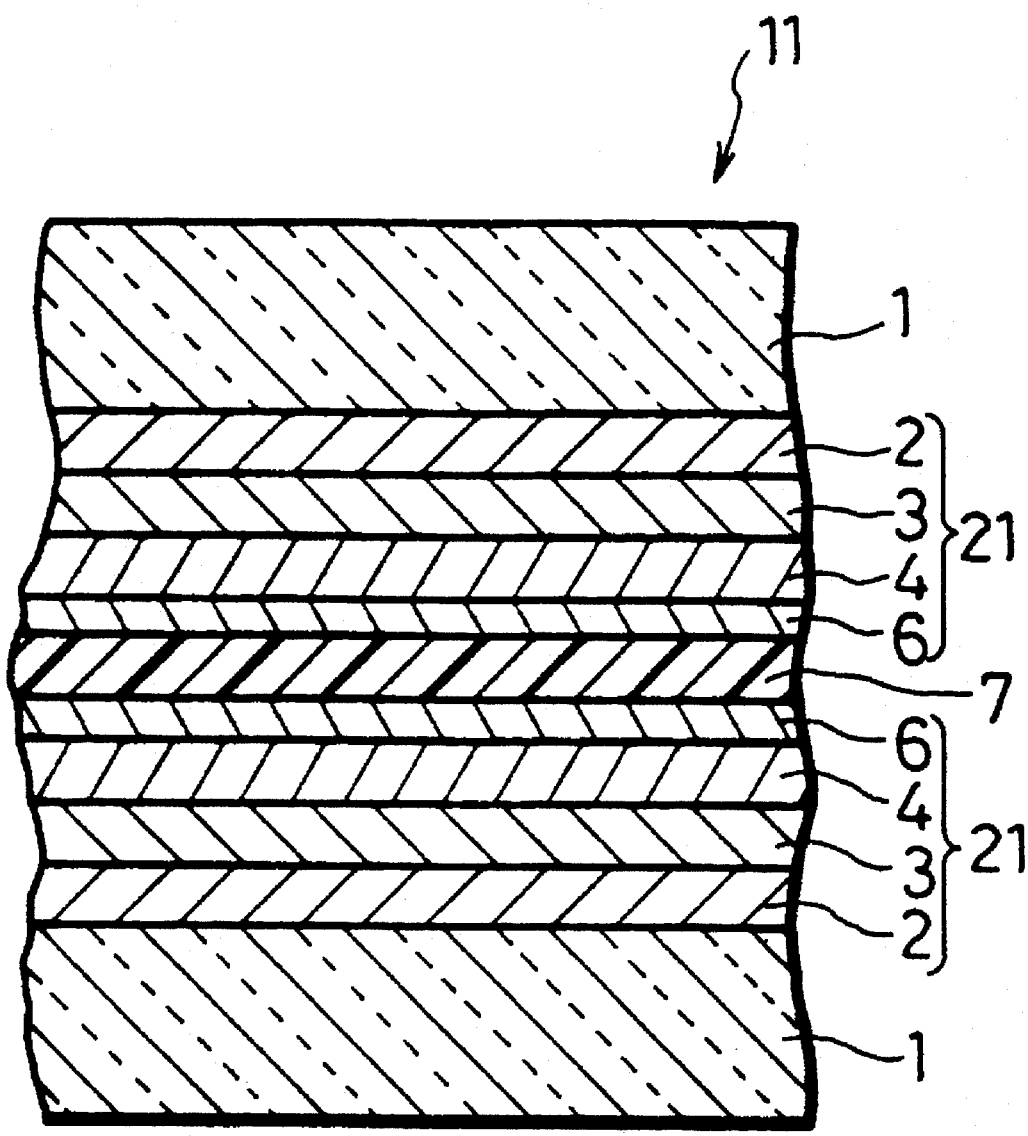
FIG. 2 is a vertical cross-sectional view showing one example of a magneto-optical disk that is used in the magneto-optical disk apparatus of FIG. 1(a).

FIG. 2 shows one example of a magneto-optical disk 11 that is used in the magneto-optical disk apparatus.

The magneto-optical disk 11, which is a so-called double-sided disk, has an arrangement wherein two magneto-optical recording media, each constituted of a light-transmitting substrate 1 (base substrate) and a magneto-optical recording layer 21 formed thereon, are bonded face to face with each other using a bonding-agent layer 7 sandwiched in between.

The magneto-optical recording layer 21 is constituted of a dielectric layer 2 having a light-transmitting property, a magnetic layer 3 (first magnetic layer), a magnetic layer 4 (second magnetic layer), and a protective layer 6, all of which are laminated in this order on the substrate 1.

The magnetic layers 3 and 4 are made of alloys of rear-earth metal and transition metal.

Figure 3:
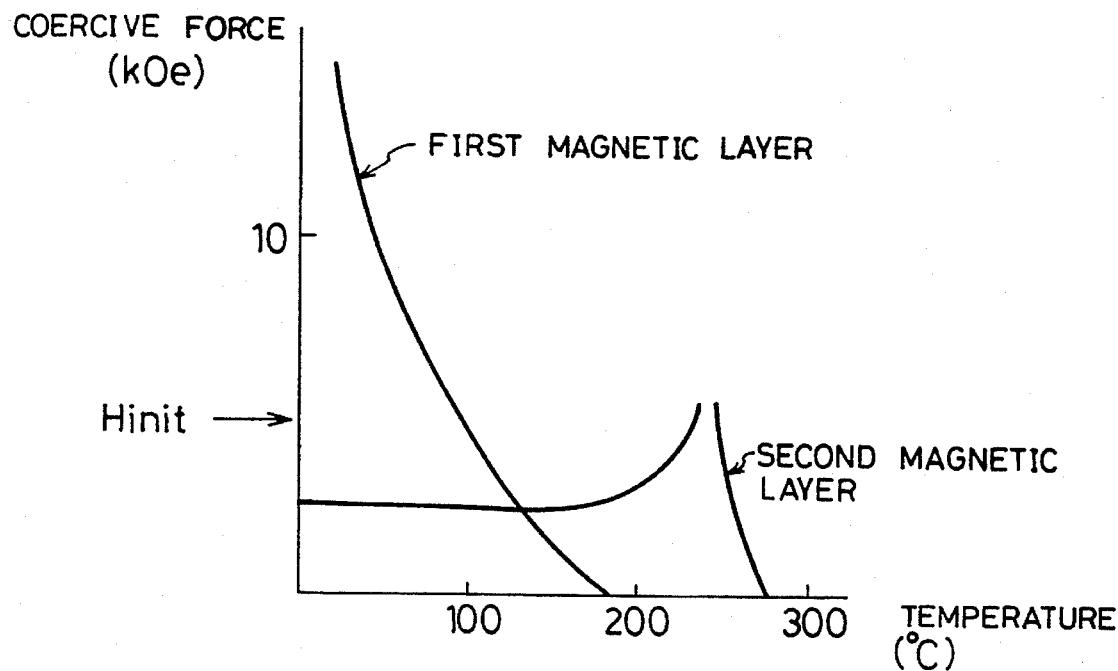
FIG. 3 is a graph showing the temperature dependency of coercive force of respective magnetic layers used in the magneto-optical disk of FIG. 2.

As shown in FIG. 3, the magnetic layer 3, which has a lower Curie point ($T_{c^1}$) and a higher coercive force ($H_{c^1}$) at room temperature compared with the magnetic layer 4, exhibits a property wherein perpendicular magnetic anisotropy is predominant from room temperature to $T_{c^1}$.

The magnetic layer 4, which has a Curie point ($T_{c^2}$) higher than $T_{c^1}$ of the magnetic layer 3 and a coercive force ($H_{c^2}$) lower than $H_{c^1}$ of the magnetic layer 3 at room temperature, exhibits a property wherein perpendicular magnetic anisotropy is predominant from room temperature to $T_{c^2}$, as well as having a compensating point ($T_{comp^2}$).

Figure 4:
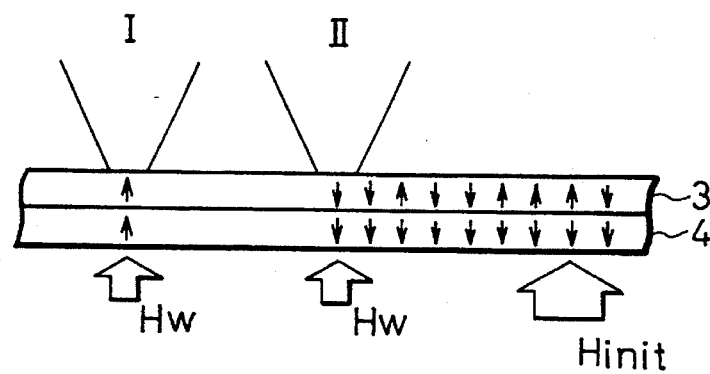
FIG. 4 is an explanatory drawing that shows a recording process of information to the magneto-optical disk of FIG. 2.

Upon recording information on the magneto-optical disk 11, an initializing operation is first carried out. In other words, as shown in FIG. 4, only the magnetization of the magnetic layer 4 is aligned to one direction by applying the upward initializing magnetic field ($H_{init}$). Here, in FIG. 4, the directions of sublattice magnetization of the transition metal are indicated by arrows in the magnetic layer 4 that is the so-called rare-earth-metal rich composition, wherein the sublattice magnetization of the rare-earth metal is greater than that of the transition metal.

The initializing operation is always carried out, or carried out only upon recording. Since $H_{c^1}$ of the magnetic layer 3 is greater than $H_{init}$, no inversion occurs in the magnetization of the magnetic layer 3.

Figure 5:
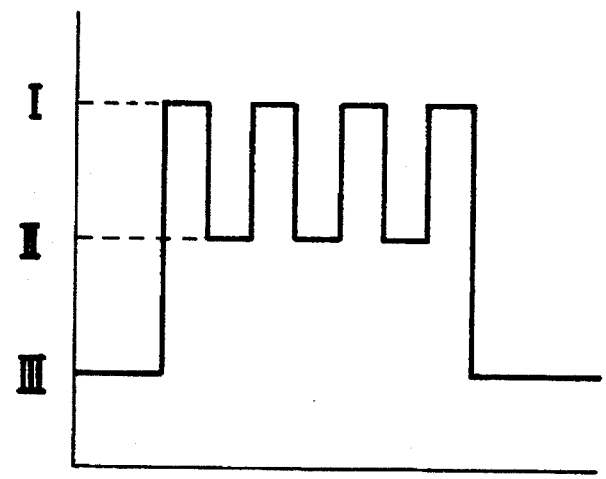
FIG. 5 is an explanatory drawing that shows the intensity of a light beam to be projected to the magneto-optical disk of FIG. 2.

A recording operation is carried out by projecting a light beam whose intensity is modulated into high level I and low level II as shown in FIG. 5, while applying the writing magnetic field ($H_w$) having the same direction as the initializing magnetic field $H_{init}$ as well as having an intensity substantially lower than $H_{init}$.

The high level I and the low level II are set in such a manner that: when the light beam of high level I is projected, both the magnetic layers 3 and 4 come to have a high temperature ($T_H$) in the vicinity of $T_{c^1}$ and $T_{c^2}$ or higher; and when the light beam of low level II is projected, only the magnetic layer 3 comes to have a temperature ($T_L$) in the vicinity of $T_{c^1}$ or higher.

Therefore, when the light beam of high level I is projected, the magnetization of the magnetic layer 4 is inverted to upward direction due to $H_w$, and during the process of cooling off, the direction of magnetization of the magnetic layer 3 comes to coincide with the direction of magnetization of the magnetic layer 4 because the direction of magnetization of the magnetic layer 4 is transferred onto the magnetic layer 3 due to an exchange coupling force that is exerted in an interface between them. Thus, the direction of the magnetic layer 3 becomes upward.

In contrast, even if the light beam of low level II is projected, $H_w$ does not invert the magnetization of the magnetic layer 4. During the process of cooling off, the direction of magnetization of the magnetic layer 3 comes to coincide with the direction of magnetization of the magnetic layer 4 because the direction of magnetization of the magnetic layer 4 is transferred onto the magnetic layer 3 due to an exchange coupling force that is exerted in an interface between them. Thus, the direction of the magnetic layer 3 becomes downward.

In other words, it becomes possible to execute the overwriting operation by the use of light beams of high level I and low level II.

Upon reproducing recorded information, another light beam of level III, which is substantially weaker than that used in recording, is projected, and the rotation of polarization plane of the reflected light beam is detected.

One sample of the magneto-optical disk 11 is shown as follows:

In sample #1, the light-transmitting substrate 1 is made of a glass disc, 86 mm in diameter, 15 mm in inner diameter, and 1.2 mm in thickness. On the surface of one side of the substrate 1, are directly formed guide tracks through the reactive ion etching method in the shape of grooves and lands for use in guiding a light beam. The track pitch is 1.6 μm, the width of the groove (the recessed portion) is 0.8 μm, and the width of the land (the protruded portion) is 0.8 μm.

On the surface of the substrate 1 having the guide tracks, the following layers are laminated: a dielectric layer 2 made of AlN, 70 nm in film thickness, which is formed through the reactive spattering method; a magnetic layer 3 made of DyFeCo, 50 nm in film thickness, which is formed through the simultaneous spattering-method of Dy, Fe and Co targets; a magnetic layer 4 made of GdDyFeCo, 50 nm in film thickness, which is formed through the simultaneous spattering method of Gd, Dy, Fe, and Co targets; and a protective layer 6 made of AlN, 70 nm in film thickness.

The spattering conditions under which the magnetic layers 3 and 4 are formed are: an ultimate vacuum of not more than $2.0 \times 10^{-4}$ Pa; an Ar gas pressure of $6.5 \times 10^{-1}$ Pa; and a discharge electric power of 300 W. The spattering conditions under which the dielectric layer 2 and the protective layer 6 are formed are: an ultimate vacuum of not more than $2.0 \times 10^{-4}$ Pa; an $N_2$ gas pressure of $3.0 \times 10^{-1}$ Pa; and a discharge electric power of 800 W.

The magnetic layer 3 has a transition-metal rich composition of $Dy_{0.19}(Fe_{0.86}Co_{0.14})_{0.81}$ with $T_{c^1}=170°$ C. and $H_{c^1}=12$ kOe at room temperature. Further, the magnetic layer 4 has a rare-earth-metal rich composition of $(Gd_{0.50}Dy_{0.50})_{0.30}(Fe_{0.72}Co_{0.28})_{0.70}$ with $T_{c^1}=250°$ C., $T_{comp^2}=210°$ C. and $H_{c^2}=1.5$ kOe at room temperature.

Two sheets of magneto-optical media thus formed are bonded to each other by using a bonding-agent layer 7, thereby resulting in sample #1 of the double-sided magneto-optical disk 11.

A material of polyurethane acrylates, which combinedly has hardening functions of three types, that is, ultraviolet, thermal, and anaerobic hardening functions, was used as the bonding-agent layer 7. By the use of this bonding-agent layer 7, it becomes possible to harden even shadow portions of the magneto-optical layer 21 through which ultraviolet rays are not allowed to transmit, because of its thermal and anaerobic hardening functions. This makes it possible to provide a magneto-optical disk 11 which has an extremely high moisture resistance as well as having long-term stability.

To this sample-#1 magneto-optical disk 11, were recorded recording bits having a length of 0.65 μm under the conditions of the laser power ($P_H$) of high level I with 10 mW and the laser power ($P_L$) of low level II with 2 mW while using the above-mentioned magnets 10 and 10'. This test resulted in a successful light-modulation overwriting operation that did not have unerased portions. When the resulting recorded bits were reproduced under the condition of the laser power ($P_R$) of level III with 1 mW, a signal-to-noise ratio (C/N) of 46 dB was obtained.

Figure 6:
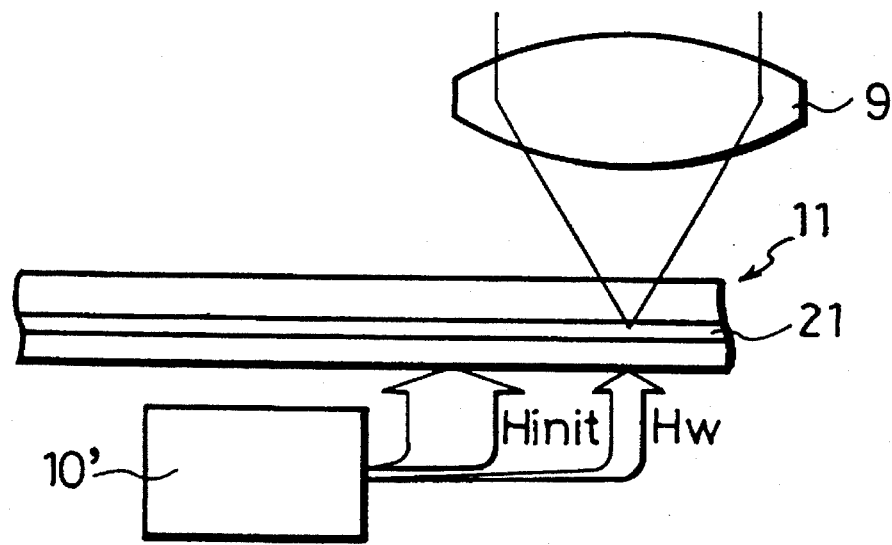
FIG. 6, which shows a comparative example, is a schematic illustration showing a magneto-optical disk apparatus.

For comparative purposes, as shown in FIG. 6, recording and reproduction tests were conducted in the same manner as described above using only the lower magnet 10', and it was found that the gap, that is, the distance from the magneto-optical recording layer 21, needed to be set to not more than 0.7 mm in order to obtain the C/N ratio of 46 dB. For this reason, it is impossible to use the magneto-optical disk 11 of the double-sided structure. More specifically, in the case of using only either the magnet 10 or the magnet 10', it is necessary for the magnet 10 or 10' to have a substantially large size in order to apply $H_{init}$ and $H_w$ having required intensities to the magnetic layers 3 and 4 while maintaining the substantially large gap.

Figure 7:
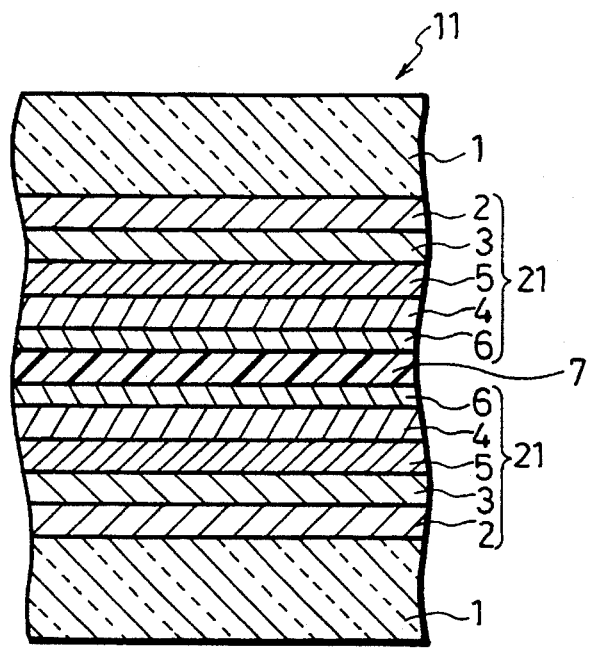
FIG. 7 is a vertical cross-sectional view showing another example of a magneto-optical disk that is used in the magneto-optical disk apparatus of FIG. 1(a).

FIG. 7 shows another example of a magneto-optical disk 11 that is used in the magneto-optical disk apparatus.

This magneto-optical disk 11 is characterized by a magnetic layer 5 (third magnetic layer) that is formed between the magnetic layers 3 and 4 shown in FIG. 2.

More specifically, the magneto-optical recording layer 21 is constituted of: a light-transmitting dielectric layer 2, the magnetic layer 3 (first magnetic layer), the magnetic layer 5 (third magnetic layer), the magnetic layer 4 (second magnetic layer) and a protective layer 6, all of which are laminated on the substrate 1 in this order.

The magnetic layers 3, 4 and 5 are made of alloys of rear-earth metal and transition metal.

Figure 8:
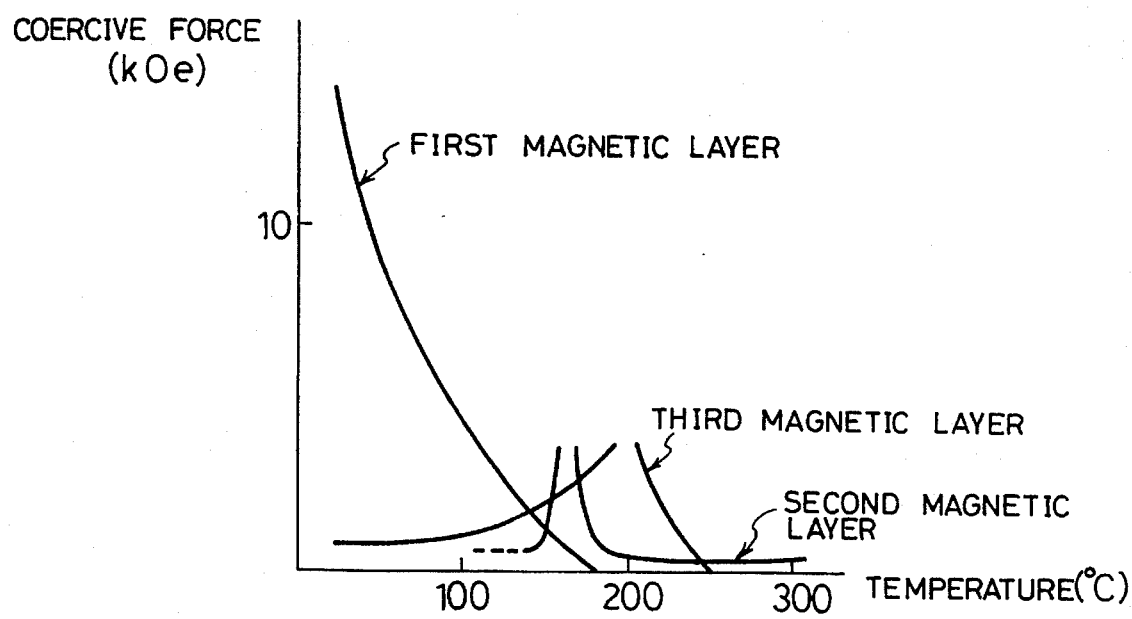
FIG. 8 is a graph showing the temperature dependency of coercive force of respective magnetic layers used in the magneto-optical disk of FIG. 7.

As shown in FIG. 8, the magnetic layer 3, which has a lower Curie point ($T_{c^1}$) and a higher coercive force ($H_{c^1}$) at room temperature compared with the magnetic layers 4 and 5, exhibits a property wherein perpendicular magnetic anisotropy is predominant from room temperature to $T_{c^1}$.

The magnetic layer 5, which has a Curie point ($T_{c^3}$) that is higher than $T_{c^1}$ of the magnetic layer 3 and a coercive force ($H_{c^3}$) that is virtually zero at room temperature, exhibits a property wherein: in-plane magnetic anisotropy and perpendicular magnetic anisotropy are virtually equal to each other at room temperature; and perpendicular magnetic anisotropy becomes predominant at temperatures not less than a predetermined temperature. The magnetic layer 5 also has a compensating temperature ($T_{comp^3}$).

The magnetic layer 4, which has a Curie point ($T_{c^2}$) higher than $T_{c^1}$ of the magnetic layer 3 and a coercive force, ($H_{c^2}$) lower than $H_{c^1}$ of the magnetic layer 3 at room temperature, exhibits a property wherein perpendicular magnetic anisotropy is predominant from room temperature to $T_{c^2}$, as well as having a compensating point ($T_{comp^2}$).

Figure 9:
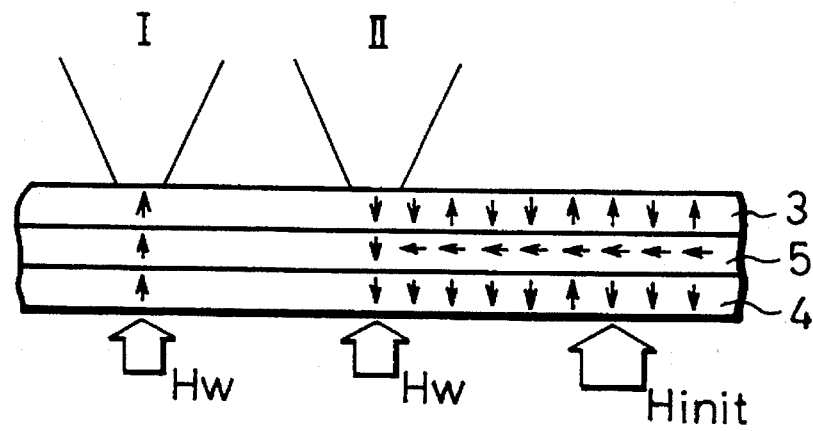
FIG. 9 is an explanatory drawing that shows a recording process of information to the magneto-optical disk of FIG. 7.

Upon recording information on the magneto-optical disk 11, an initializing operation is first carried out. In other words, as shown in FIG. 9, only the magnetization of the magnetic layer 4 is aligned to one direction by applying the upward initializing magnetic field ($H_{init}$). Here, in FIG. 9, the directions of sublattice magnetization of the transition metal are indicated by rare-earth-metal rich composition, wherein the sublattice magnetization of the rare-earth metal is greater than that of the transition metal.

The initializing operation is always carried out, or carried out only upon recording. Since $Hc_1$ of the magnetic layer 3 is greater than $H_{init}$ and since the magnetic layer 5 exhibits the property wherein in-plane magnetic anisotropy is virtually equal to perpendicular magnetic anisotropy, the direction of magnetization of the magnetic layer 4 is not transferred onto the magnetic layer 3 through the magnetic layer 5. Therefore, no inversion occurs in the magnetization of the magnetic layer 3.

A recording operation is carried out by projecting a light beam whose intensity is modulated into high level I and low level II as shown in FIG. 5, while applying the writing magnetic field ($H_w$) having the same direction as the initializing magnetic field $H_{init}$ as well as having an intensity substantially lower than $H_{init}$. The high level I and the low level II are set in such a manner that: when the light beam of high level I is projected, both the magnetic layers 3 and 4 come to have a high temperature ($T_H$) in the vicinity of $T_{c^1}$ and $T_{c^2}$ or higher; and when the light beam of low level II is projected, only the magnetic layer 3 comes to have a temperature ($T_L$) in the vicinity of $T_{c^1}$ or higher.

Therefore, when the light beam of high level I is projected, the magnetization of the magnetic layer 4 is inverted to upward direction due to $H_w$, and during the process of cooling off, the magnetic layer 5 also comes to exhibit perpendicular magnetic anisotropy; therefore, the direction of magnetization of the magnetic layer 4 is transferred onto the magnetic layer 5 due to an exchange coupling force that is exerted in an interface between them, and the direction of magnetization of the magnetic layer 5 is further transferred onto the magnetic layer 3, thereby allowing the direction of magnetization of the magnetic layer 3 to coincide with the direction of magnetization of the magnetic layer 4. Thus, the direction of the magnetic layer 3 becomes upward.

In contrast, even if the light beam of low level II is projected, $H_w$ does not invert the magnetization of the magnetic layer 4. During the process of cooling off, the magnetic layer 5 also comes to exhibit perpendicular magnetic anisotropy; therefore, the direction of magnetization of the magnetic layer 4 is transferred onto the magnetic layer 5 due to an exchange coupling force that is exerted in an interface between them, and the direction of magnetization of the magnetic layer 5 is further transferred onto the magnetic layer 3, thereby allowing the direction of magnetization of the magnetic layer 3 to coincide with the direction of magnetization of the magnetic layer 4. Thus, the direction of the magnetic layer 3 becomes downward.

In other words, it becomes possible to execute the overwriting operation by the use of light beams of high level I and low level II.

Upon reproducing recorded information, another light beam of level III, which is substantially weaker than that used in recording, is projected, and the rotation of polarization plane of the reflected light beam is detected.

One sample of this magneto-optical disk 11 is shown as follows:

Sample #2 is the same as sample #1 except that it is provided with the magnetic layer 5.

The magnetic layer 5, which has a rare-earth-metal rich composition of $Gd_{0.28}(Fe_{0.61}Co_{0.39})_{0.72}$ with a thickness of 50 nm, exhibits properties: $T_{c^3} \geq 300°$ C.; $T_{comp^3} = 150°$ C.; and $H_{c^3} \equiv 0$ kOe at room temperature.

The recording and reproduction tests, which were the same as those conducted on sample #1, were conducted on sample-#2 magneto-optical disk 11 by using the aforementioned magnets 10 and 10'. These tests resulted in a successful light-modulation overwriting operation that did not have any unerased portions, and a signal-to-noise ratio (C/N) of 46 dB was obtained.

Figure 10:
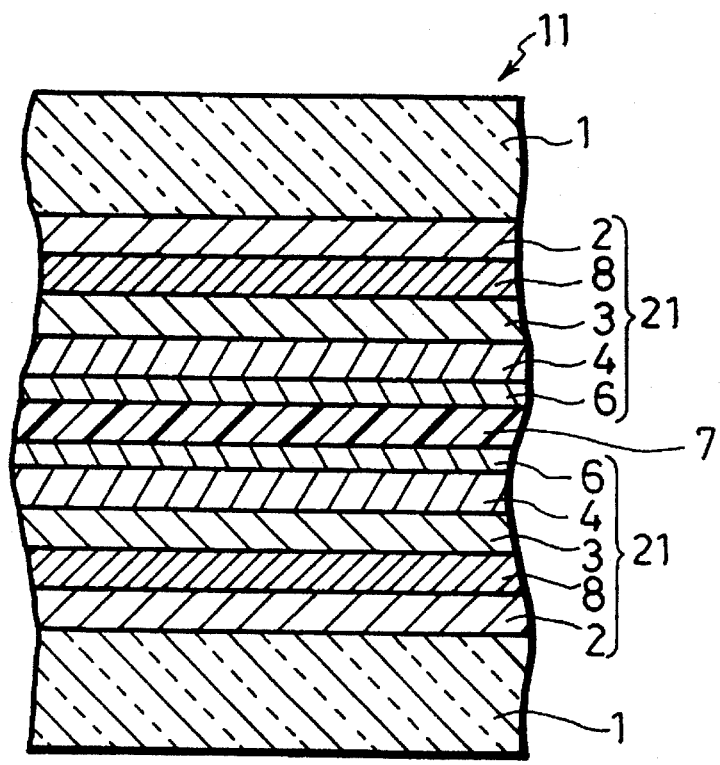
FIG. 10 is a vertical cross-sectional view showing still another example of a magneto-optical disk that is used in the magneto-optical disk apparatus of FIG. 1(a).

FIG. 10 shows still another example of a magneto-optical disk that is used in the aforementioned magneto-optical disk apparatus.

This magneto-optical disk 11 is characterized by a magnetic layer 8 (0-th magnetic layer) that is formed between the dielectric layer 2 and the magnetic layer 3 shown in FIG. 2.

More specifically, the magneto-optical recording layer 21 is constituted of: the light-transmitting dielectric layer 2, the magnetic layer 8 (0-th magnetic layer), the magnetic layer 3 (first magnetic layer), the magnetic layer 5 (third magnetic layer), the magnetic layer 4 (second magnetic layer) and a protective layer 6, all of which are laminated from the substrate 1 in this order.

The magnetic layer 8, which has a Curie point ($T_{co}$) that is higher than that of the magnetic layer 3 as well as having virtually zero coercive force ($H_{co}$) at room temperature, exhibits in-plane magnetic anisotropy at room temperature, and also exhibits perpendicular magnetic anisotropy at temperatures not less than a predetermined temperature.

The initializing and recording operations with respect to the magneto-optical disk 11 are carried out in the same manner as described earlier.

Upon reproducing recorded information, another light beam of level III, which is substantially weaker than that used in recording, is projected, and the rotation of polarization plane of the reflected light beam is detected. The magnetic layer 8 exhibits in-plane magnetic anisotropy at room temperature, but when irradiated by the light beam of level III, only a portion situated in the center of the light-beam spot comes to exhibit perpendicular magnetic anisotropy. Thus, it is possible to reproduce information by the use of the reflected light beam from this portion that exhibits perpendicular magnetic anisotropy. The size of the portion exhibiting perpendicular magnetic anisotropy is smaller than the size of the light-beam spot; therefore, this arrangement is less susceptible to adverse effects caused by the adjacent recorded bits, compared with an arrangement without the magnetic layer 8. Thus, it becomes possible to reproduce shorter recorded bits.

One sample of this magneto-optical disk 11 is shown as follows:

Sample #3 is the same as the aforementioned sample #2 except that it is provided with a magnetic layer 8.

The magnetic layer 8, which has a rare-earth-metal rich composition of $Gd_{0.25}(Fe_{0.80}Co_{0.20})_{0.75}$ with a thickness of 50 nm, exhibits properties: $T_{co} = 300°$ C.; no compensating temperature; $H_{c^3} \equiv 0$ kOe at room temperature; and perpendicular magnetic anisotropy is exerted at about 100° C.

The recording and reproduction tests, which were the same as those conducted on sample #1, were conducted on sample-#3 magneto-optical disk 11 by using the aforementioned magnets 10 and 10'. These tests resulted in a successful light-modulation overwriting operation that did not have any unerased portions, and a signal-to-noise ratio (C/N) of 48 dB was obtained. Compared with sample #2 having the C/N ratio of 46 dB, sample #3 has better signal quality. It is considered that the reason for this lies in the fact that the setting of $T_{co} > T_{c^1}$ allows the Kerr rotation angle to become greater.

Moreover, as the recorded bits became shorter, the C/N ratio of sample #2 abruptly dropped, while the C/N ratio of sample #3 did not drop so much. It is considered that the reason for this lies in the installation of the magnetic layer 8, as described earlier.

As described above, the magnets 10 and 10' of the present embodiment makes it possible to realize a more compact, thinner magneto-optical disk apparatus that is capable of light-modulation overwriting onto the double-sided magneto-optical disk 11.

In the above-mentioned embodiment, the paired magnets 10 and 10' are disposed on this side before a portion to be irradiated by the light beam with respect to the rotation direction of the magneto-optical disk 11; however, another arrangement may be adopted, wherein another pair of magnets 10 and 10' are disposed on the other side over the portion to be irradiated by the light beam with respect to the rotation direction of magneto-optical disk 11. In this case, the magnetization of the added magnets 10 and 10' is set to be opposite to the magnetization of the original magnets 10 and 10'. In other words, the arrangement is made so that the magnetic poles of the added magnets 10, 10' and the original magnets 10, 10', each pair of which are aligned face to face with each other, have the same polarity respectively.

With this arrangement, since two closed magnetic circuits, each of which is made of the magnets 10 and 10', are disposed symmetrically with respect to the light beam, the leakage magnetic fields to be applied from the magnets 10 and 10' to an actuator section (not shown) of an optical pickup has a symmetrical, uniform-distribution. This makes it possible to reduce adverse effects on the actuator section caused by the leakage magnetic fields.

Moreover, since a combined magnetic field from the two pairs of the magnets 10 and 10' is applied to a portion irradiated by the light beam as the magnetic field $H_w$, the distance from the magnets 10 and 10' to the light beam spot may be further widened, thereby making it possible to further reduce the adverse effects on the actuator section caused by the leakage magnetic fields.

Referring to FIGS. 11 through 14, the following description will discuss the second embodiment of the present invention. Here, for convenience of explanation, those members that have the same functions and that are described in the aforementioned embodiment are indicated by the same reference numerals and the description thereof is omitted.

Figure 11:
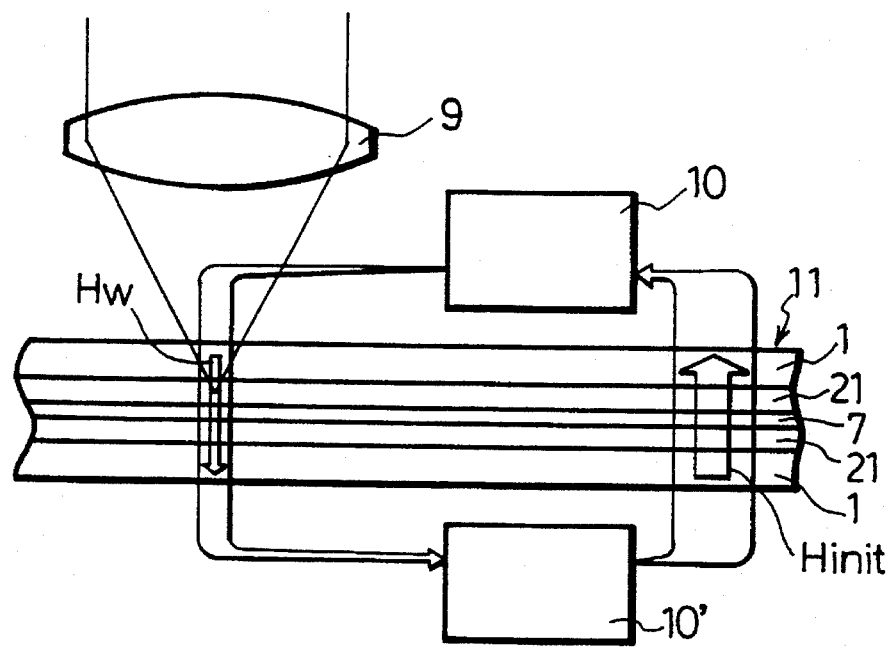
FIG. 11, which shows the second embodiment of the present invention, is a schematic illustration showing a magneto-optical disk apparatus.

The magneto-optical disk apparatus of the present invention is different from that described in the aforementioned embodiment in that, as illustrated in FIG. 11, the paired magnets 10 and 10' are disposed on the other side over a portion to be irradiated by the light beam, that is, on the side toward which the rotation of the magneto-optical disk 11 is made (rightward in FIG. 11). With this arrangement, the initializing magnetic field $H_{init}$ that is perpendicular to the magneto-optical disk 11 is applied to the other side over the portion irradiated by the light beam, and the writing magnetic field $H_w$ that is virtually antiparallel to $H_{init}$ and is weaker than $H_{init}$ is applied to the portion irradiated by the light beam.

Figure 12:
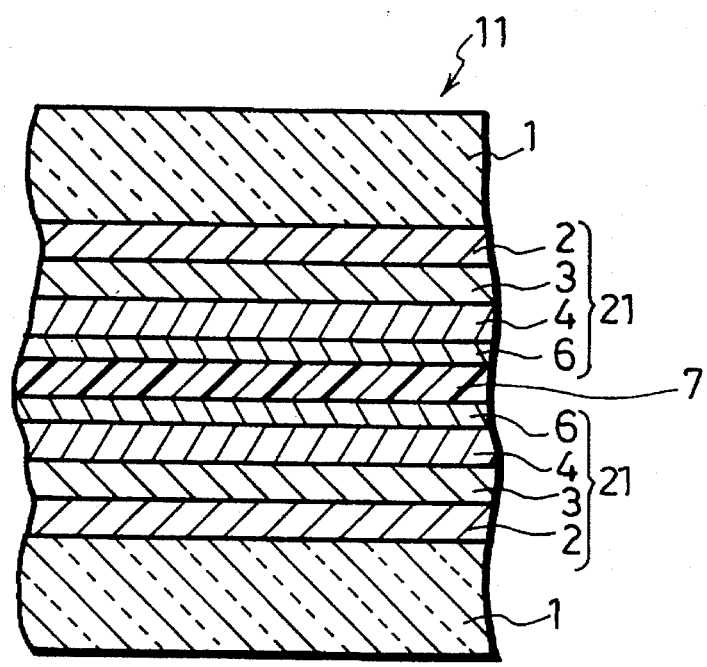
FIG. 12 is a vertical cross-sectional view showing one example of a magneto-optical disk that is used in the magneto-optical disk apparatus of FIG. 11.

FIG. 12 shows one example of a magneto-optical disk 11 that is used in the above-mentioned magneto-optical disk apparatus.

The magneto-optical disk 11, which is a so-called double-sided disk, has an arrangement wherein two magneto-optical recording media, each constituted of a light-transmitting substrate 1 (base substrate) and a magneto-optical recording layer 21 formed thereon, are bonded face to face with each other using a bonding-agent layer 7 sandwiched in between.

The magneto-optical recording layer 21 is constituted of a dielectric layer 2 having a light-transmitting property, a magnetic layer 3 (first magnetic layer), a magnetic layer 4 (second magnetic layer), and a protective layer 6, all of which are laminated in this order on the substrate 1.

The magnetic layers 3 and 4 are made of alloys of rear-earth metal and transition metal.

Figure 13:
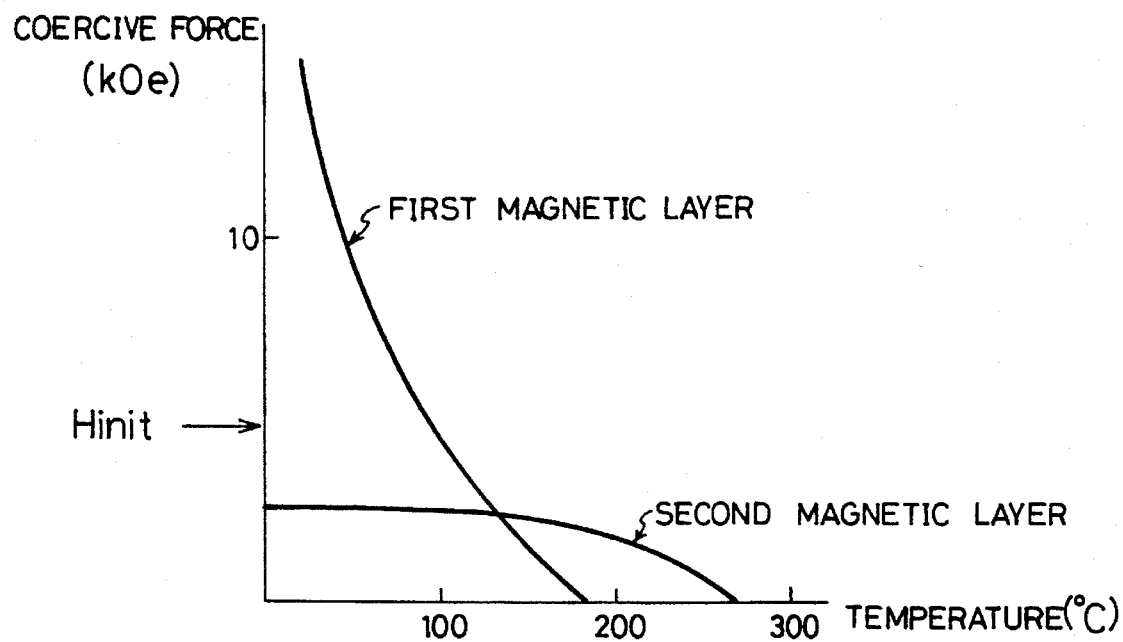
FIG. 13 is a graph showing the temperature dependency of coercive force of respective magnetic layers used in the magneto-optical disk of FIG. 12.

As shown in FIG. 13, the magnetic layer 3, which has a lower Curie point ($T_{c^1}$) and a higher coercive force ($H_{c^1}$) at room temperature compared with the magnetic layer 4, exhibits a property wherein perpendicular magnetic anisotropy is predominant from room temperature to $T_{c^1}$.

The magnetic layer 4, which has a Curie point ($T_{c^2}$) higher than $T_{c^1}$ of the magnetic layer 3 and a coercive force ($H_{c^2}$) lower than $H_{c^1}$ of the magnetic layer 3 at room temperature, exhibits a property wherein perpendicular magnetic anisotropy is predominant from room temperature to $T_{c^2}$, and does not have a compensating point ($T_{comp^2}$).

Figure 14:
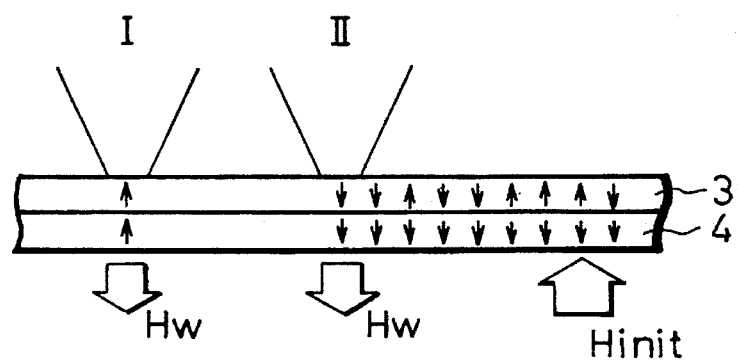
FIG. 14 is an explanatory drawing that shows a recording process of information to the magneto-optical disk of FIG. 12.

Upon recording information on the magneto-optical disk 11, an initializing operation is first carried out. In other words, as shown in FIG. 14, only the magnetization of the magnetic layer 4 is aligned to one direction by applying the upward initializing magnetic field. ($H_{init}$). Here, in FIG. 14, the directions of sublattice magnetization of the transition metal are indicated by arrows in the magnetic layer 4 that is the so-called rare-earth-metal rich composition, wherein the sublattice magnetization of the rare-earth metal is greater than that of the transition metal.

The initializing operation is always carried out, or carried out only upon recording. Since $H_{c^1}$ of the magnetic layer 3 is greater than $H_{init}$, no inversion occurs in the magnetization of the magnetic layer 3.

A recording operation is carried out by projecting a light beam whose intensity is modulated into high level I and low level II, while applying the writing magnetic field ($H_w$) having the opposite direction to the initializing magnetic field $H_{init}$ as well as having an intensity substantially lower than $H_{init}$.

The high level and the low level are set in such a manner that: when the light beam of high level I is projected, both the magnetic layers 3 and 4 come to have a high temperature ($T_H$) in the vicinity of $T_{c^1}$ and $T_{c^2}$ or higher; and when the light beam of low level II is projected, only the magnetic layer 3 comes to have a temperature ($T_L$) in the vicinity of $T_{c^1}$ or higher.

Therefore, when the light beam of high level I is projected, the magnetization of the magnetic layer 4 is inverted to upward direction due to $H_w$, and during the process of cooling off, the direction of magnetization of the magnetic layer 3 comes to coincide with the direction of magnetization of the magnetic layer 4 because the direction of magnetization of the magnetic layer 4 is transferred onto the magnetic layer 3 due to an exchange coupling force that is exerted in an interface between them. Thus, the direction of the magnetic layer 3 becomes upward.

In contrast, even if the light beam of low level II is projected, $H_w$ does not invert the magnetization of the magnetic layer 4. During the process of cooling off, the direction of magnetization of the magnetic layer 3 comes to coincide with the direction of magnetization of the magnetic layer 4 because the direction of magnetization of the magnetic layer 4 is transferred onto the magnetic layer 3 due to an exchange coupling force that is exerted in an interface between them. Thus, the direction of the magnetic layer 3 becomes downward.

In other words, it becomes possible to execute the overwriting operation by the use of light beams of high level I and low level II.

Upon reproducing recorded information, another light beam of level III, which is substantially weaker than that used in recording, is projected, and the rotation of polarization plane of the reflected light beam is detected.

One sample of this magneto-optical disk 11 is shown as follows:

Sample #4 is the same as sample #1 except that it is provided with a magnetic layer 4.

The magnetic layer 4, which has a rare-earth-metal rich composition of $(Gd_{0.50}Dy_{0.50})_{0.32}(Fe_{0.68}Co_{0.32})_{0.68}$, exhibits properties: $T_{c^2}=250°$ C.; and $H_{c^2}=1.5$ kOe at room temperature, and does not have a compensating temperature.

The recording and reproduction tests, which were the same as those conducted on sample #1, were conducted on sample-#4 magneto-optical disk 11 by using the aforementioned magnets 10 and 10'. These tests resulted in a successful light-modulation overwriting operation that did not have any unerased portions, and a signal-to-noise ratio (C/N) of 46 dB was obtained.

In the present embodiment also, it becomes possible to make the magneto-optical disk apparatus more compact and thinner by using the magnets 10 and 10', in the same manner as the aforementioned embodiment.

Referring to FIGS. 15 through 18, the following description will discuss the third embodiment of the present invention. Here, for convenience of explanation, those members that have the same functions and that are described in the aforementioned embodiment 1 are indicated by the same reference numerals and the description thereof is omitted.

Figure 15:
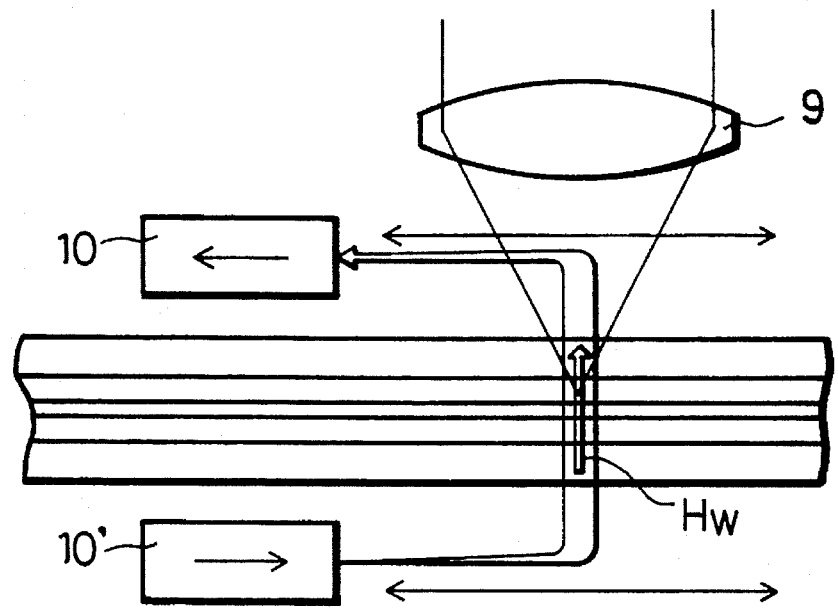
FIG. 15, which shows the third embodiment of the present invention, is a schematic illustration showing a magneto-optical disk apparatus.

The magneto-optical disk apparatus of the present invention is different from that described in the aforementioned embodiment in that, as illustrated in FIG. 15, the paired magnets 10 and 10' are arranged so that they are shiftable in parallel with the surface of the magneto-optical disk 11. By this parallel movement of the magnets 10 and 10', it becomes possible to switch the direction of $H_w$ to be applied to the portion irradiated by the light beam between upward and downward directions.

Figure 16:
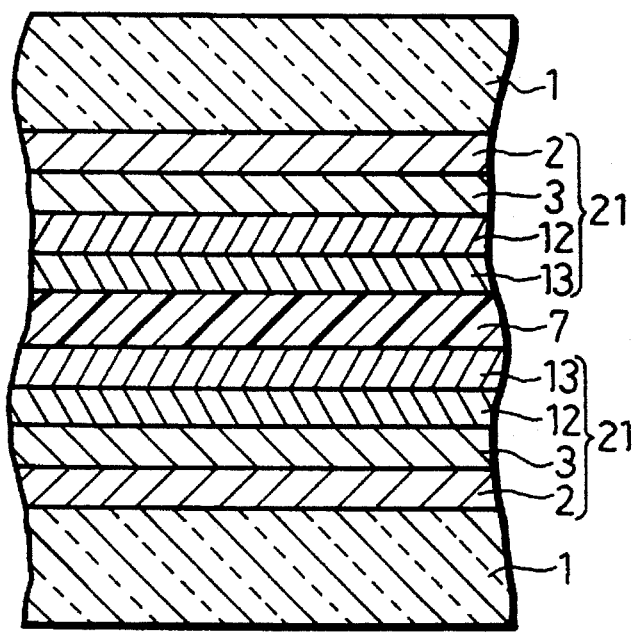
FIG. 16 is a vertical cross-sectional view showing one example of a magneto-optical disk that is used in the magneto-optical disk apparatus of FIG. 15.

FIG. 16 shows one example of the magneto-optical disk 11 that is used in the above-mentioned magneto-optical disk apparatus.

The magneto-optical disk 11, which is a so-called double-sided disk, has an arrangement wherein two magneto-optical recording media, each constituted of a light-transmitting substrate 1 (base substrate) and a magneto-optical recording layer 21 formed thereon, are bonded face to face with each other using a bonding-agent layer 7 sandwiched in between.

The magneto-optical recording layer 21, which has a so-called four-layer reflective-film structure, is constituted of a dielectric layer 2 having a light-transmitting property, a magnetic layer 3 having an easy axis of magnetization perpendicular to the layer surface, a dielectric layer 12 having a light-transmitting property, and a reflective layer 13, all of which are laminated in this order on the substrate 1.

Upon recording information on the magneto-optical disk 11, an erasing operation is first carried out by projecting a light beam while applying $H_w$. Then, the direction of $H_w$ is inverted by the parallel movement of the magnets 10 and 10'. In this state, the light-modulation recording is carried out.

Upon reproducing recorded information, another light beam, which is substantially weaker than that used in recording, is projected, and the rotation of polarization plane of the reflected light beam is detected.

One sample of this magneto-optical disk 11 is shown as follows:

Sample #5 is the same as sample #1 except that it is provided with a magnetic layer 3, a dielectric layer 12 having a light-transmitting property, and a reflective layer 13.

The magnetic layer 3 is made of $Dy_{0.23}(Fe_{0.78}Co_{0.22})_{0.77}$ with a film thickness of 20 nm, wherein $H_{c^1}$ is not less than 16 kOe at room temperature. The dielectric layer 12 is made of AlN with a film thickness of 25 nm, and the reflective layer 13 is made of Al with a film thickness of 50 nm.

Recording and reproduction tests were conducted on sample-#5 magneto-optical disk 11. Permanent magnets containing Nd that are identical to those used in the first embodiment are used as the magnets 10 and 10'. When these magnets 10 and 10' were set at positions 0.5 mm apart from the substrates 1 of the magneto-optical disk 11 as well as 7 mm apart from the light-beam spot, it was possible to apply a magnetic field $H_w$ of 250 Oe to the magneto-optical disk 11. Recording bits having a length of 0.76 μm were recorded by using a recording and erasing laser power of 5.5 mW, and the resulting recorded bits were reproduced; this test resulted in a C/N ratio of 50 dB. The C/N ratio was improved compared with the aforementioned embodiment; this is considered to be due to the enhanced Kerr effect.

In the present embodiment also, it becomes possible to make the magneto-optical disk apparatus more compact and thinner by using the magnets 10 and 10', in the same manner as the aforementioned embodiments.

Figure 17:
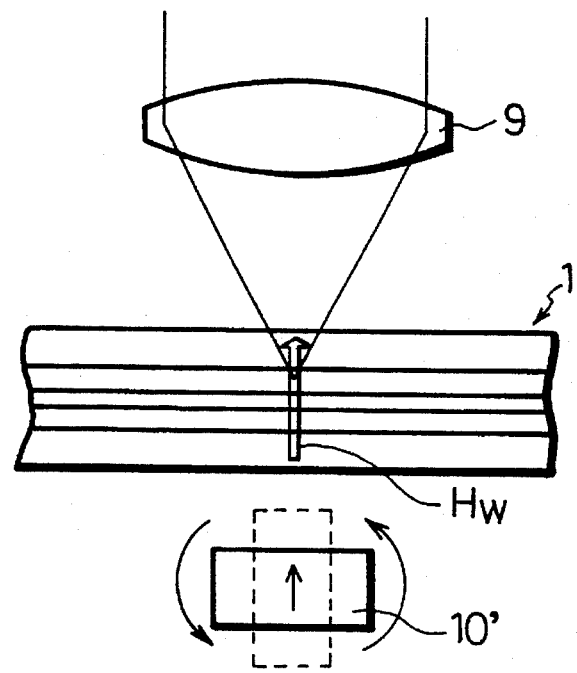
FIG. 17, which shows a comparative example, is a schematic illustration showing a magneto-optical disk apparatus.

For comparative purposes, the same recording and reproducing test as described above was carried out by using only the magnet 10' on the lower side as shown in FIG. 17, and a C/N ratio identical to that described above was obtained. In this case, however, it is necessary to provide a pivoting mechanism for the magnet 10' in order to invert the polarity of $H_w$; this causes a difficulty in making the magneto-optical disk apparatus thinner.

Figure 18:
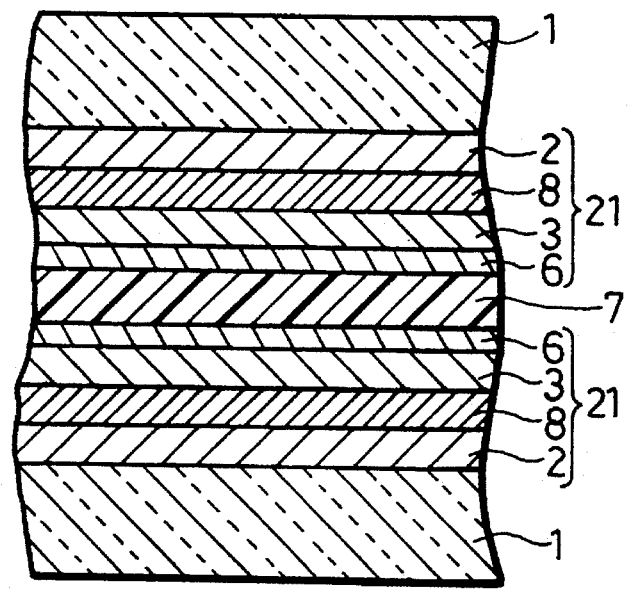
FIG. 18 is a vertical cross-sectional view showing another example of a magneto-optical disk that is used in the magneto-optical disk apparatus of FIG. 15.

FIG. 18 shows another example of the magneto-optical disk 11 that is used in the above-mentioned magneto-optical disk apparatus.

The magneto-optical disk 11, which is a so-called double-sided disk, has an arrangement wherein two magneto-optical recording media, each constituted of a light-transmitting substrate 1 (base substrate) and a magneto-optical recording layer 21 formed thereon, are bonded face to face with each other using a bonding-agent layer 7 sandwiched in between.

The magneto-optical recording layer 21 is constituted of a dielectric layer 2 having a light-transmitting property, a magnetic layer 8 (0-th magnetic layer), a magnetic layer 3 having an easy axis of magnetization perpendicular to the layer surface, and a protective layer 6, all of which are laminated in this order on the substrate 1.

The magnetic layer 8, which has a Curie point ($T_{co}$) that is higher than that of the magnetic layer 3 as well as having virtually zero coercive force ($H_{co}$) at room temperature, exhibits in-plane magnetic anisotropy at room temperature, and also exhibits perpendicular magnetic anisotropy at temperatures not less than a predetermined temperature.

One sample of this magneto-optical disk 11 is shown as follows:

The magnetic layer 8 of the sample #6, which has a rare-earth-metal rich composition of $Gd_{0.26}(Fe_{0.82}Co_{0.18})_{0.74}$ with a film thickness of 50 nm, exhibits properties: $T_{c^2}$=300° C.; and $H_{c^2}\cong 0$ kOe at room temperature, and exhibits perpendicular magnetic anisotropy at approximately 100° C.

The magnetic layer 3 is made of $Dy_{0.23}(Fe_{0.78}Co_{0.22})_{0.77}$ with a film thickness of 50 nm, and has $H_{c^1}$ not less than 16 kOe at room temperature.

Recording and reproduction tests were conducted on sample-#6 magneto-optical disk 11 under the same conditions as those used on sample #5. These tests resulted in a C/N ratio of 50 dB. The resulting C/N, which is the same as that of sample #5, is considered to be the effect of the use of the magnetic layer 8 having high $T_{co}$. Moreover, as with sample #3 in the aforementioned embodiment, even if the recorded bits became shorter, the C/N ratio of sample #6 did not drop so much. It is considered that the reason for this lies in the use of the magnetic layer 8, as described earlier.

Referring to FIGS. 19 through 23, the following description will discuss the fourth embodiment of the present invention. Here, for convenience of explanation, those members that have the same functions and that are illustrated in the drawings of the aforementioned embodiments are indicated by the same reference numerals and the description thereof is omitted.

Figure 19:
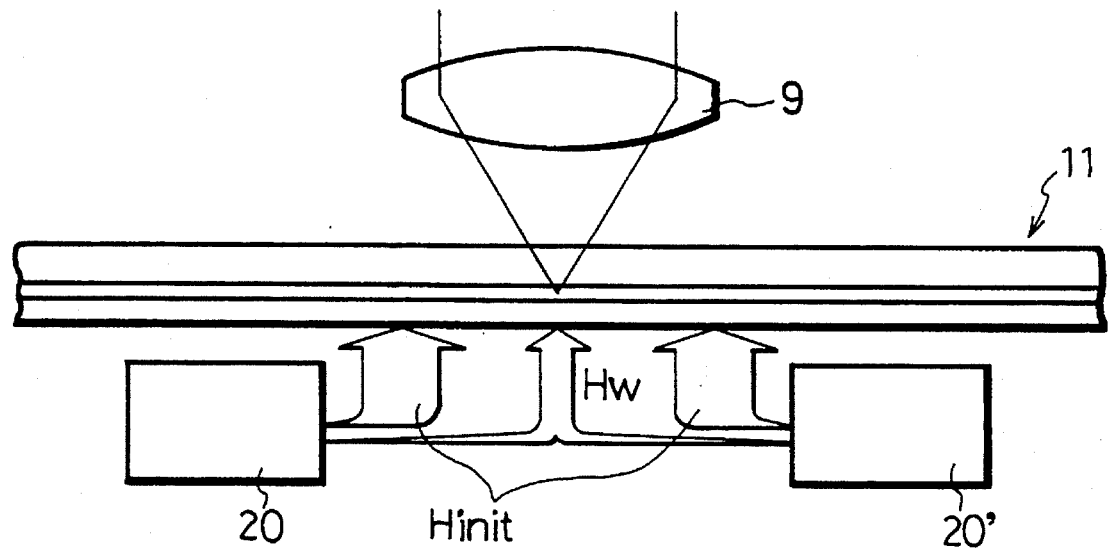
FIG. 19, which shows the fourth embodiment of the present invention, is a schematic illustration showing a magneto-optical disk apparatus.

As illustrated in FIG. 19, the magneto-optical disk apparatus of the present embodiment is provided with: an objective lens 9 for converging a light beam to a magneto-optical recording layer 21 of a magneto-optical disk; and magnets 20 and 20' (external-magnetic-field applying means) which are disposed on one side of the magneto-optical disk 11 and which generate an initializing magnetic field ($H_{init}$) and a writing magnetic field ($H_w$).

The magnets 20 and 20', which are disposed symmetrically with respect to the light beam, are arranged so that their magnetizations have opposite directions to each other, and are virtually parallel to the surface of the magneto-optical disk 11. With this arrangement, the magnetic field $H_{init}$ that is perpendicular to the magneto-optical disk 11 is applied onto this side of a portion irradiated by the light beam as well as onto the other side over the portion with respect to the rotation direction of the magneto-optical disk 11, while the magnetic field $H_w$, which is virtually parallel to $H_{init}$ and weaker than $H_{init}$, is applied to the portion irradiated by the light beam.

In the above-mentioned arrangement, the magnetic fields $H_{init}$ and $H_w$, which have a perpendicular upward direction, are applied to the magneto-optical disk 11 from the magnets 20 and 20'. Since the magnets 20 and 20' are disposed so that the magnetizations of the magnets 20 and 20' have opposite directions to each other, namely, so that the same magnetic poles are aligned face to face with each other, it is possible to make the magnetic field $H_{init}$ greater even if small magnets are used as the magnets 20 and 20'. This makes it possible to miniaturize the magneto-optical disk apparatus. Moreover, since the magnets 20 and 20' are disposed so that the magnetizations of the magnets 20 and 20' are virtually parallel to the surfaces of the magneto-optical disk 11, it becomes possible to make the magneto-optical disk apparatus thinner.

Furthermore, it is possible to apply not only $H_{init}$, but also $H_w$ merely by using the magnets 20 and 20'. For this reason, this arrangement allows the magnets 20 and 20' to be located apart from an actuator (not shown) of the objective lens 9 for making the light beam follow a track on the magneto-optical disk 11 as well as apart from an actuator (not shown) of the objective lens 9 for focusing the light beam onto the track. This alleviates to a great degree the adverse effects of leakage magnetic field that are caused on the actuators from the magnets 20 and 20'.

For example, permanent magnets of the Nd system having a density of residual magnetic flux of 1.21 Tesla are used as the magnets 20 and 20'. The size of the magnets 20 and 20' is in the order of 20 mm in width along the radius of the magneto-optical disk 11, 30 mm in length along the track of the magneto-optical disk 11, and 2 mm in thickness.

When these magnets 20 and 20' were set at positions 0.5 mm apart from the magneto-optical recording layer 21, as well as 5 mm apart from a light-beam spot, a magnetic field $H_{init}$ of 3 kOe, as well as a magnetic field $H_w$ of 400 Oe, was applied to the magneto-optical disk 11.

Further, the leakage magnetic field around the objective lens 9, that is, the leakage magnetic field in the vicinity of the actuators, was 630 Oe, and its fluctuation was extremely small. In addition, the distribution of the leakage magnetic field was uniform and symmetrical with respect to the light beam.

Figure 20:
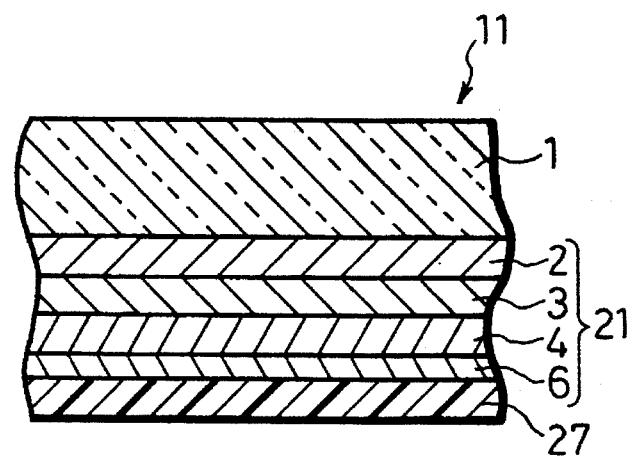
FIG. 20 is a vertical cross-sectional view showing one example of a magneto-optical disk that is used in the magneto-optical disk apparatus of FIG. 19.

FIG. 20 shows one example of the magneto-optical disk 11 that is used in the above-mentioned magneto-optical disk apparatus.

The magneto-optical disk 11, which is a so-called single-sided disk, has an arrangement wherein a magneto-optical recording layer 21 and an over-coat layer 27 are formed on a light-transmitting substrate 1 (base substrate) in this order.

The magneto-optical recording layer 21 is constituted of a dielectric layer 2 having a light-transmitting property, a magnetic layer 3 (first magnetic layer), a magnetic layer 4 (second magnetic layer), and a protective layer 6, all of which are laminated in this order on the substrate 1.

The light-modulation overwriting method and the reproducing method are the same as those used in the aforementioned embodiment 1.

One sample of this magneto-optical disk 11 is shown as follows:

Sample #7 has a construction wherein the over-coat layer 27 is formed on the magneto-optical recording layer 21 of sample #1 in the aforementioned first embodiment. The over-coat layer 27 is formed by coating the magneto-optical recording layer 21 with ultraviolet-ray hardening resin of the acrylate family, and hardening it by irradiation of ultraviolet rays.

The recording and reproduction tests, which were the same as those conducted on sample #1, were conducted on sample-#7 magneto-optical disk 11 by using the magnets 20 and 20', and these tests resulted in a successful light-modulation overwriting operation that did not have unerased portions, thereby obtaining a signal-to-noise ratio (C/N) of 46 dB. Further, there were no adverse effects on the actuators.

Figure 21:
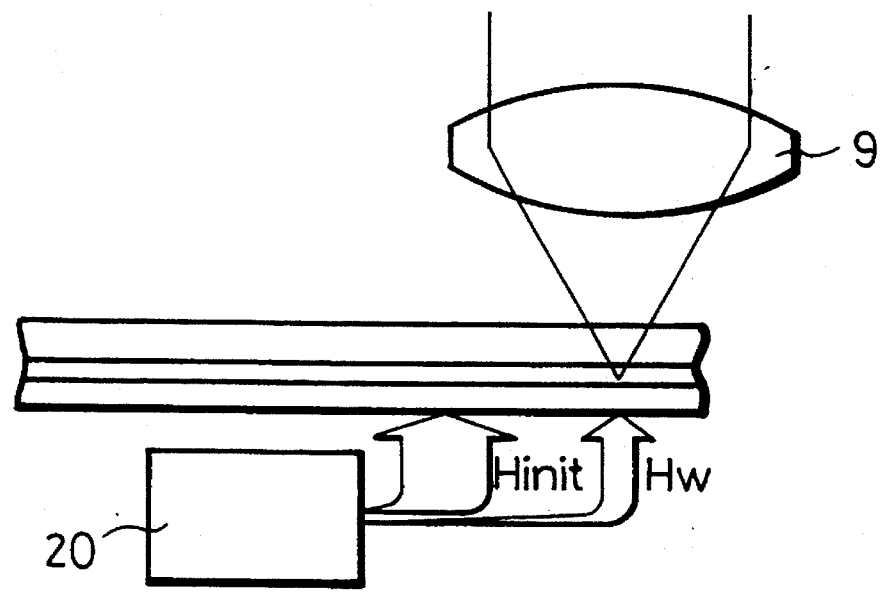
FIG. 21, which shows a comparative example, is a schematic illustration showing a magneto-optical disk apparatus.

For comparative purposes, the same recording and reproducing test as described above was carried out by using only the magnet 20, as shown in FIG. 21. In this case, in order to obtain a C/N ratio of 46 dB, it was necessary to set the magnet 20 at a position 3 mm apart from the light beam spot. In other words, compared with the present embodiment, it was necessary to set it closer by 2 mm. Therefore, the leakage magnetic field fluctuated in the vicinity of the actuators, and its distribution ranged from 300 to 500 Oe. This caused malfunction in the actuators.

Figure 22:
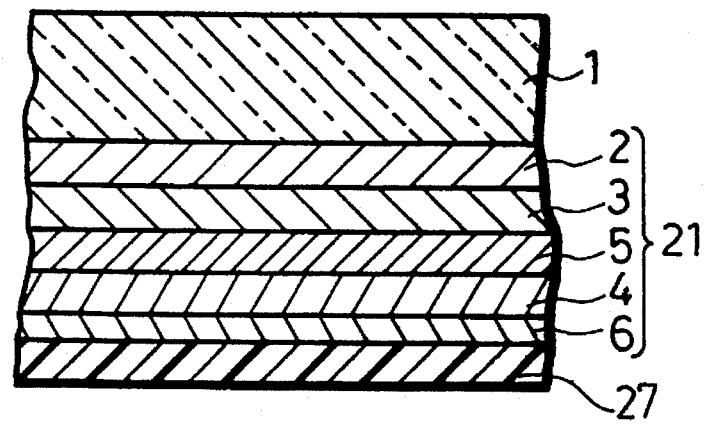
FIG. 22 is a vertical cross-sectional view showing another example of a magneto-optical disk that is used in the magneto-optical disk apparatus of FIG. 19.

FIG. 22 shows another example of the magneto-optical disk 11 that is used in the above-mentioned magneto-optical disk apparatus.

The magneto-optical disk 11 has a construction wherein a magnetic layer 5 (third magnetic layer) is formed between the magnetic layers 3 and 4 shown in FIG. 20.

The light-modulation overwriting method and the reproducing method are the same as those used in the aforementioned embodiment 1.

One sample of this magneto-optical disk 11 is shown as follows:

Sample #8 has a construction wherein the over-coat layer 27 is formed on the magneto-optical recording layer 21 of sample #2 in the aforementioned first embodiment. The over-coat layer 27 is formed by coating the magneto-optical recording layer 21 with ultraviolet-ray hardening resin of the acrylate family, and hardening it by irradiation of ultraviolet rays.

The recording and reproduction tests, which were the same as those conducted on sample #7, were conducted on sample-#8 magneto-optical disk 11 by using the magnets 20 and 20', and these tests resulted in a successful light-modulation overwriting operation that did not have unerased portions, thereby obtaining a signal-to-noise ratio. (C/N) of 46 dB. Further, there were no adverse effects on the actuators.

Figure 23:
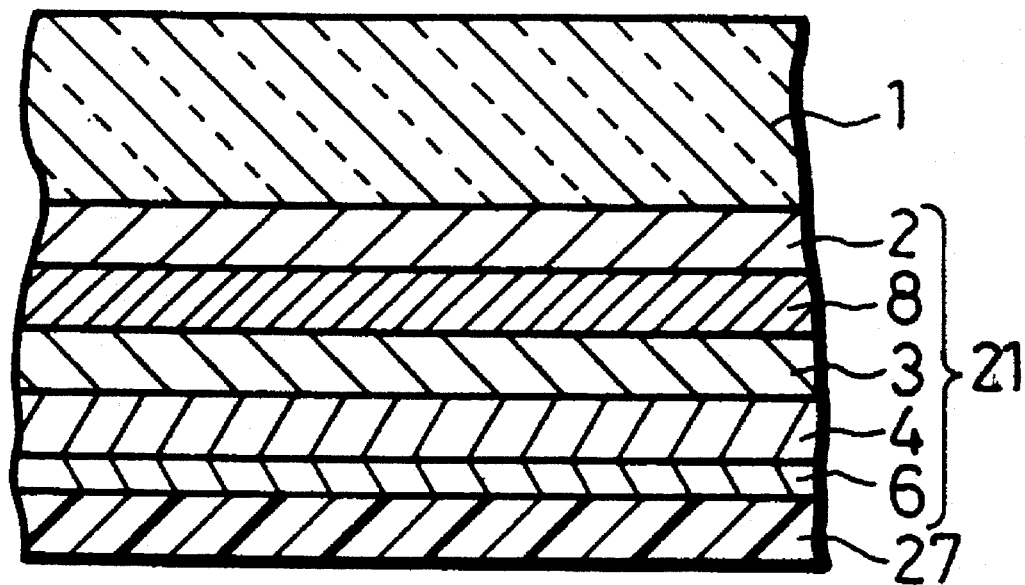
FIG. 23 is a vertical cross-sectional view showing still another example of a magneto-optical disk that is used in the magneto-optical disk apparatus of FIG. 19.

FIG. 23 shows still another example of the magneto-optical disk 11 that is used in the above-mentioned magneto-optical disk apparatus.

The magneto-optical disk 11 has a construction wherein a magnetic layer 8 (0-th magnetic layer) is formed between the dielectric layer 2 and the magnetic layer 3 shown in FIG. 20.

The light-modulation overwriting method and the reproducing method are the same as those used in the aforementioned embodiment 1.

One sample of this magneto-optical disk 11 is shown as follows:

Sample #9 has a construction wherein the over-coat layer 27 is formed on the magneto-optical recording layer 21 of sample #3 in the aforementioned first embodiment. The over-coat layer 27 is formed by coating the magneto-optical recording layer 21 with ultraviolet-ray hardening resin of the acrylate family, and hardening it by irradiation of ultraviolet rays.

The recording and reproduction tests, which were the same as those conducted on sample #7, were conducted on sample-#9 magneto-optical disk 11 by using the magnets 20 and 20', and these tests resulted in a successful light-modulation overwriting operation that did not have unerased portions, thereby obtaining a signal-to-noise ratio (C/N) of 46 dB. Further, there were no adverse effects on the actuators.

In the first through fourth embodiments described above, glass is used as the substrate 1 of samples #1 through #9 of the magneto-optical disk 11. Besides this, it is possible to employ the following materials as the substrate: chemically reinforced glass; a so-called glass substrate with 2P-layer, wherein an ultraviolet-ray hardening resin is formed on a substrate made of the above-mentioned glass; polycarbonate (PC); poly methyl methacrylate (PMMA); amorphous polyolefine (APO); polystyrene (PS); polychlorobiphenyl (PVC); epoxy, etc.

The film thickness of AlN in the transparent dielectric layer 2 is not intended to be limited to 80 nm. The film thickness of the transparent dielectric layer 2 is determined by taking into consideration the so-called Kerr-effect enhancement by which upon reproducing a magneto-optical disk, the polar Kerr rotation angle from the recording layer 3 is increased by utilizing the coherent effects of light. In order to make the signal quality (C/N) as great as possible, it is necessary to increase the polar Kerr rotation angle; therefore, the film thickness of the transparent dielectric layer 2 is determined so that the polar Kerr rotation angle becomes the greatest.

The film thickness is changed depending on the wavelength of the reproduction-use light and the refractive index of the transparent dielectric layer 2. In the present embodiment, AlN having a refractive index of 2.0 is employed; therefore, in the case of the reproduction-use-light wavelength of 780 nm, when the film thickness of AlN of the transparent dielectric layer 2 is set in the order of 30 to 120 nm, it is possible to have a greater Kerr-effect enhancement. Here, it is desirable to set the film thickness of AlN of the transparent dielectric layer 2 in the order of 70 to 100 nm, and within this range the polar Kerr rotation angle becomes virtually the greatest.

Further, in the case of the reproduction-use-light wavelength of 400 nm, it is preferable to set the film-thickness of the transparent dielectric layer 2 to about one-half (=400/780) of the above-mentioned value. If the refractive index is different from the above-mentioned value due to the difference of materials or the difference of manufacturing methods, the film thickness of the transparent dielectric layer 2 is preferably determined so that the value obtained by multiplying its refractive index by film thickness (light-path length) remains the same.

As is explained above, the greater the refractive index of the transparent dielectric layer 2, the thinner the film thickness that is required. Further, the greater the refractive index, the greater the enhancing effects of the polar Kerr rotation angle.

AlN varies in its refractive index with changes in the ratio, gas pressures, and other factors of Ar and $N_2$ which are sputtering gases used during the sputtering process. However, AlN has a relatively large refractive index that virtually ranges from 1.8 to 2.1, and is preferably employed as the material of the transparent dielectric layer 2.

Further, the transparent dielectric layer 2 is not only effective in the Kerr-effect enhancement, but also utilized in cooperation with the protective layer 6 for preventing oxidation of the magnetic layers made of the respective rare-earth-transition-metal alloys, such as the magnetic layers 3 through 5 and the magnetic layers 8 and 3 through 5.

Magnetic films made of rare-earth-transition-metals tend to suffer from oxidation, and in particular the rare-earth metals are more likely to suffer from oxidation. For this reason, without taking proper measures to prevent external oxygen and moisture from entering the films, their characteristics would seriously deteriorate due to oxidation.

Therefore, in samples #1 through #9, the arrangement is made so that both sides of the magnetic layers 3 through 5, or the magnetic layers 8 and 3 through 5 are sandwiched by AlN. AlN forms a nitride film which has no oxygen in its ingredients, and provides an excellent material that has good resistance to moisture.

In addition, AlN films are obtained by the reactive DC (direct current) sputtering operation wherein an Al target is utilized in $N_2$ gas atmosphere or in a mixed gas atmosphere of Ar and $N_2$. This operation is more advantageous than the RF (high frequency) spattering operation because of its high film-forming speed.

As to materials of the transparent dielectric layer 2 other than AlN, the following materials which have relatively great refractive indexes are preferably adopted: SiN, AlSiN, AlTaN, SiAlON, TiN, TiON, BN, ZnS, $TiO_2$, $BaTiO_3$, $SrTiO_3$, etc.

Among these materials, in particular, SiN, AlSin, AlTaN, TiN, BN, and ZnS are most preferably used to provide magneto-optical disks having excellent moisture resistance, because they do not contain oxygen in their compositions.

The composition of DyFeCo of the magnetic layer 3, the composition of GdFeCo of the magnetic layer 4, and the composition of GdDyFeCo of the magnetic layer 5 are not intended to be limited to the above-mentioned compositions. As to the materials of the magnetic layers 3 through 5, the same effects are obtained by using alloys made of at least one kind of rare-earth metal selected from the group of Gd, Tb, Dy, Ho, and Nd and at least one kind of transition metal selected from the group of Fe and Co.

Adding at least one kind of element selected from the group of Cr, V, Nb, Mn, Be, Ni, Ti, Pt, Rh and Cu to the above-mentioned material makes it possible to improve resistances to various environmental conditions of the magnetic layers 3 though 5. In other words, this arrangement reduces the deterioration of characteristics of the magnetic layers 3 and 5 due to invasion of oxygen and the resulting oxidization, thereby preparing magneto-optical disks which are superior in long-term reliability.

The film thicknesses of the magnetic layers 3 through 5 are determined by taking into consideration the correlation among the materials, compositions and film thicknesses of the magnetic layers 3 through 5. The film thickness of the magnetic layer 3 is preferably set to not less than 20 nm, more preferably, not less than 30 nm. If it is too thick, information on the magnetic layer 5 is not copied thereon; therefore, the film thickness is preferably not more than 100 nm. The film thickness of the magnetic layer 4 is preferably set to not less than 5 nm, more preferably, to a range from 10 to 50 nm. If it is too thick, information on the magnetic layer 5 is not copied thereon; therefore, the film thickness is preferably not more than 100 nm. The film thickness of the magnetic layer 5 is preferably set to not less than 20 nm, more preferably, to a range from 10 to 50 nm. Since too much thickness results in a decreased recording sensitivity, the film thickness is preferably set to not more than 200 nm.

Here, if $T_{c^1}$ of the magnetic layer 3 is less than 100° C., the C/N ratio goes lower than 45 dB, which is a minimum level required for the digital recording-reproduction operation. Moreover, $T_{c^1}$ beyond 250° C. causes a decreased recording sensitivity. Therefore, $T_{c^1}$ of the magnetic layer 3 is preferably set to a range from 100° to 250° C. If $H_{c^1}$ of the magnetic layer 3 is less than 5 kOe at room temperature, the magnetic layer 3 might be partially initialized due to $H_{init}$. For this reason, $H_{c^1}$ of the magnetic layer 3 at room temperature is preferably set to not less than 5 kOe.

If the temperature at which the magnetic layer 4 comes to exhibit perpendicular magnetic anisotropy is less than 80° C., copy of magnetization from the magnetic layer 5 to the magnetic layer 4, as well as copy of magnetization from the magnetic layer 4 to the magnetic layer 3, occurs at a temperature between room temperature and the temperature attained by the irradiation of the light beam $P_R$. Therefore, $H_{init}$ initializes not only the magnetic layer 5, but also the magnetic layer 3, making the recording impossible. For this reason, it is preferable to set the temperature at which the magnetic layer 4 comes to exhibit perpendicular magnetic anisotropy to not less than 80° C.

Moreover, if $T_{c^2}$ of the magnetic layer 4 is less than $T_{c^1}$ of the magnetic layer 3, copy of magnetization is not carried out well upon conducting an light-modulation overwriting operation. Therefore, it is suitable to set $T_{c^2}$ of the magnetic layer 4 to not less than $T_{c^1}$.

If $T_{c^3}$ of the magnetic layer 5 is less than 150° C., the light-modulation overwriting operation is not carried out well, since the gap between $P_L$ and $P_R$ is minimized. Further, $T_{c^3}$ beyond 400° C. leads to a decreased signal sensitivity. Therefore, it is suitable to set $T_{c^3}$ of the magnetic layer 5 to a range from 150° to 400° C. It is not preferable to have $H_{c^3}$ of the magnetic layer 5 exceed 3 kOe at room temperature, since this arrangement makes the generation device of $H_{init}$ become bulky. For this reason, it is suitable to set $H_{c^3}$ of the magnetic layer 5 at room temperature to not more than 3 kOe.

Moreover, it is preferable to have $T_{comp^3}$ of the magnetic layer 5 that is lower than $T_{comp^2}$ of the magnetic layer 4, because the margin of intensity of high-level light beam I, as well as the margin of intensity of low-level light beam II, is allowed to increase, and because static magnetic force of the magnetic layer 4 is utilized when information of the magnetic layer 4 is transferred onto the magnetic layer 5 during the process of cooling off and the information is further transferred onto the magnetic layer 3.

The film thickness of AlN of the protective layer 6 is 80 nm in the present embodiments, but the present invention is not intended to be limited to this value. The film thickness of the protective layer 6 is preferably set to a range from 1 to 200 nm.

In the present embodiments, the combined film thickness of the magnetic layers 3 through 5 or the magnetic layers 3 through 5 and 8 is not less than 100 nm, and the film thickness of this size hardly allows the incident light from the optical pickup to transmit the magnetic layers. Therefore, there is no particular limitation in the film thickness of the protective layer 6, and any film thickness may be adopted as long as it is thick enough to prevent oxidization of the magnetic layers for a long time. If the material has a low antioxidization property, the film thickness needs to be thicker, while if the material has a high antioxidization property, the film thickness may be thinner.

The thermal conductivity of the protective layer 6, as well as that of the transparent dielectric layer 2, has effects on the recording sensitivity characteristics of the magneto-optical disk. The recording sensitivity characteristics represent how much laser power is required for recording or erasing. When light is incident on the magneto-optical disk, most of the light passes through the transparent dielectric film 2, and is converted into heat by being absorbed by the magnetic layers 3 through 5 or the magnetic layers 3 through 5 and 8, which are absorbing films. In this case, the heat of the magnetic layers 3 through 5 or the magnetic layers 3 through 5 and 8 is conducted to the transparent dielectric layer 2 and the protective layer 6 through thermal conductivity. Therefore, the thermal conductivities and thermal capacities (specific heats) of the transparent dielectric layer 2 and the protective layer 6 have effects on the recording sensitivity.

This means that the recording sensitivity of a magneto-optical disk may be controlled by changing the film thickness of the protective layer 6 to a certain degree. For example, in order to increase the recording sensitivity (in order to enable recording and erasing by the use of a low laser power), the film thickness of the protective layer 6 is reduced. Commonly, it is advantageous to increase the recording sensitivity to a certain degree in order to extend the life of the laser; therefore, the thinner the film thickness of the protective layer 6, the better.

AlN, which is preferable from the above-mentioned point of view, also has a superior moisture resistance; therefore, when used as the protective layer 6, it makes the film thickness thinner, and achieves a magneto-optical disk with high recording sensitivity.

By adopting the same AlN to form the protective layer 6 and the transparent dielectric layer 2, the present embodiments provide a magneto-optical disk with superior moisture resistance, and by forming the protective layer 6 and the transparent dielectric layer 2 using the same material, they also improve the productivity.

As to materials of the protective layer 6 other than AlN, the following materials, which are the same as used for the materials of the transparent dielectric layer 2, are preferably adopted when the aforementioned objectives and effects are taken into consideration: SiN, AlSiN, AlTaN, SiAlON, TiN, TiON, BN, ZnS, $TiO_2$, $BaTiO_3$, and $SrTiO_3$. Among these materials, in particular, SiN, AlSin, AlTaN, TiN, BN, and ZnS are most preferably used to provide magneto-optical disks having excellent moisture resistance, because they do not contain oxygen in their compositions.

As to materials of the bonding-agent layer 7, adhesives of polyurethane acrylates are most preferably used. These adhesives, which combinedly have hardening functions of three types, that is, ultraviolet, thermal, and anaerobic hardening functions, are advantageous in that it is possible to harden shadow portions of the recording-medium layer which do not allow ultraviolet rays to transmit, because of its thermal and anaerobic hardening functions. This makes it possible to provide a magneto-optical disk of double-sided type which has an extremely high moisture resistance as well as having long-term stability.

Single-sided disks, which are half as thick as double-sided magneto-optical disks, are advantageous for use in, for example, a recording-reproduction apparatus for which compactness is required.

Double-sided disks, which enable double-side reproduction, are advantageous for use in, for example, a large-capacity recording-reproduction apparatus.

In the above-mentioned embodiments, explanations have been given by exemplifying a magneto-optical disk as the magneto-optical recording medium; yet, the present invention may be applied to a magneto-optical tape and a magneto-optical card.

Further, in the above-mentioned embodiments, explanations have been given by exemplifying a magneto-optical disk apparatus as the magneto-optical recording apparatus; yet, the present invention may be applied to a magneto-optical tape apparatus, magneto-optical card apparatus, and a magneto-optical recording-reproduction apparatus.

Moreover, permanent magnets are employed as the external-magnetic field applying means; yet, electromagnets may also be adopted.

The first magneto-optical disk apparatus in accordance with the present invention is provided with: an objective lens 9 for focusing a light beam onto a magneto-optical disk 11; and a pair of magnets 10 and 10' which are disposed on the respective sides of the magneto-optical disk 11 and which apply a writing magnetic field onto a portion of the magneto-optical disk 11 that has been irradiated by the light beam while applying an initializing magnetic field greater than the writing magnetic field onto a portion apart from the portion irradiated by the light beam. Further, the paired magnets 10 and 10' are arranged so that each line going from the N-pole to S-pole is virtually parallel to the magneto-optical disk 11 and the lines going from the N-pole to S-pole are antiparallel to each other.

With this arrangement, since the paired magnets 10 and 10' virtually form a closed magnetic circuit, it becomes possible to utilize the magnetic flux from the magnets 10 and 10' effectively. This makes it possible to miniaturize the magnets 10 and 10'. Therefore, the magneto-optical disk device, which allows light-modulation overwriting, can be made more compact and thinner.

The second magneto-optical disk device in accordance with the present invention, which has basically the same arrangement as the first magneto-optical disk device, is provided with two sets of the paired magnets 10 and 10', and the two sets of the magnets 10 and 10' are disposed symmetrically with respect to an axis that passes through the portion irradiated by the light beam and is perpendicular to the magneto-optical disk 11.

In addition to the functions and effects of the first magneto-optical disk apparatus, this arrangement applies a combined magnetic field from the two sets of the magnets 10 and 10' to the magneto-optical disk 11 as a writing magnetic field; therefore, it becomes possible to miniaturize the magnets 10 and 10', thereby allowing the magnets 10 and 10' to be located apart from the portion irradiated by the light beam. Therefore, the magneto-optical disk apparatus, which allows light-modulation overwriting, can be made more compact and thinner. Furthermore, the leakage magnetic field from the magnets 10 and 10' has a uniform distribution in the proximity of the objective lens 9; therefore, even if an actuator, which magnetically drives the objective lens 9 for tracking and focusing, is installed, the leakage magnetic field hardly gives adverse effects on the actuator.

The third magneto-optical disk device in accordance with the present invention is provided with: an objective lens 9 for focusing a light beam onto a magneto-optical disk 11; a pair of magnets 10 and 10' which are disposed on the respective sides of the magneto-optical disk 11 and which apply a writing magnetic field and an erasing magnetic field onto a portion of the magneto-optical disk 11 that has been irradiated by the light beam; and a shifting means for shifting the magnets 10 and 10' in parallel with the magneto-optical disk 11 so as to switch the writing magnetic field and the erasing magnetic field. Here, the paired magnets 10 and 10' are arranged so that each line going from the N-pole to S-pole is virtually parallel to the magneto-optical recording medium and the lines going from the N-pole to S-pole are antiparallel to each other.

With this arrangement, since the paired magnets 10 and 10' virtually form a closed magnetic circuit, it becomes possible to utilize the magnetic flux from the magnets 10 and 10' effectively. This makes it possible to miniaturize the magnets 10 and 10'. Therefore, the magneto-optical disk apparatus, which allows light-modulation overwriting and wherein a commonly used magneto-optical disk 11 without any auxiliary layer is employed, can be made more compact and thinner.

The fourth magneto-optical disk apparatus in accordance with the present invention is provided with: an objective lens 9 for focusing a light beam onto a magneto-optical disk 11; and a pair of magnets 20 and 20' which are disposed on one side of the magneto-optical disk 11 and which apply a writing magnetic field onto a portion of the magneto-optical disk 11 that has been irradiated by the light beam while applying an initializing magnetic field greater than the writing magnetic field onto a portion apart from the portion irradiated by the light beam. Here, the paired magnets 20 and 20' are arranged so that: each line going from the N-pole to S-pole is virtually parallel to the magneto-optical disk 11; the lines going from the N-pole to S-pole are antiparallel to each other; and they are aligned symmetrically with respect to an axis that passes through the portion irradiated by the light beam and is perpendicular to the magneto-optical recording medium.

With this arrangement, a combined magnetic field from the paired magnets 20 and 20' is applied to the magneto-optical disk 11 as a writing magnetic field. This makes it possible to miniaturize the magnets 20 and 20', thereby allowing the magnets 20 and 20' to be located apart from the portion irradiated by the light beam. Therefore, the magneto-optical disk apparatus, which allows light-modulation overwriting, can be made more compact and thinner. Furthermore, the leakage magnetic field from the magnets 20 and 20' has a uniform distribution in the proximity of the objective lens 9; therefore, even if an actuator, which magnetically drives the objective lens 9 for tracking and focusing, is installed, the leakage magnetic field hardly gives adverse effects on the actuator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording apparatus comprising:

an objective lens for focusing a light beam onto a magneto-optical recording medium; and a pair of permanent magnets for applying a writing magnetic field onto a portion of the magneto-optical recording medium that has been irradiated by the light beam while applying an initializing magnetic field onto a portion apart from the portion irradiated by the light beam, the paired permanent magnets being disposed on opposite sides of the magneto-optical recording medium, wherein the paired permanent magnets are positioned with respect to the recording medium such that a direction of magnetization of each permanent magnet is substantially parallel to a surface of the magneto-optical recording medium and respective directions of magnetization of the paired permanent magnets are anti-parallel to each other.

2. The magneto-optical recording apparatus as defined in claim 1, further comprising two sets of paired permanent magnets, the two sets being disposed symmetrically with respect to one another about an axis perpendicular to a surface of the magneto-optical recording medium and which passes through the portion irradiated by the light beam.

3. The magneto-optical recording apparatus as defined in claim 1, wherein the permanent magnets have a leaf shape.

4. The magneto-optical recording apparatus as defined in claim 3, wherein the permanent magnets are made of magnetic material containing Nd.

5. The magneto-optical recording apparatus as defined in claim 4, wherein the magnetic material has a density of residual magnetic flux of not less than 1.2 Tesla.

6. A magneto-optical recording apparatus comprising:

an objective lens for focusing a light beam onto a magneto-optical recording medium;

a pair of permanent magnets for applying a writing magnetic field and an erasing magnetic field onto a portion of the magneto-optical recording medium that has been irradiated by the light beam, the paired permanent magnets being disposed on opposite respective sides of the magneto-optical recording medium; and a shifting means for shifting the permanent magnets in parallel with the magneto-optical recording medium so as to switch the writing magnetic field and the erasing magnetic field, wherein the paired permanent magnets are arranged so that a direction of magnetization of each permanent magnet is substantially parallel to a surface of the magneto-optical recording medium and respective directions of magnetization of the paired permanent magnets are antiparallel to each other.

7. The magneto-optical recording apparatus as defined in claim 6, wherein the permanent magnets have a leaf shape.

8. The magneto-optical recording apparatus as defined in claim 7, wherein the permanent magnets are made of magnetic material containing Nd.

9. The magneto-optical recording apparatus as defined in claim 8, wherein the magnetic material has a density of residual magnetic flux of not less than 1.2 Tesla.

10. A magneto-optical recording apparatus comprising:

an objective lens for focusing a light beam onto a magneto-optical recording medium; and a pair of permanent magnets for applying a writing magnetic field onto a portion of the magneto-optical recording medium that has been irradiated by the light beam while applying an initializing magnetic field onto a portion apart from the portion irradiated by the light beam, the paired permanent magnets being disposed on one side of the magneto-optical recording medium, wherein the paired permanent magnets are arranged so that a direction of magnetization of each permanent magnet is substantially parallel to a surface of the magneto-optical recording medium and respective directions of magnetization of the paired permanent magnets are antiparallel to each other; said permanent magnets being aligned symmetrically with respect to one another about an axis perpendicular to a surface of the magneto-optical recording medium and which passes through the portion irradiated by the light beam.

11. The magneto-optical recording apparatus as defined in claim 10, wherein the permanent magnets have a leaf shape.

12. The magneto-optical recording apparatus as defined in claim 11, wherein the permanent magnets are made of magnetic material containing Nd.

13. The magneto-optical recording apparatus as defined in claim 12, wherein the magnetic material has a density of residual magnetic flux of not less than 1.2 Tesla.

14. A magneto-optical recording apparatus comprising:

an objective lens for focusing a light beam onto a magneto-optical recording medium; and a pair of electromagnets for applying a writing magnetic field onto a portion of the magneto-optical recording medium that has been irradiated by the light beam while applying an initializing magnetic field onto a portion apart from the portion irradiated by the light beam, the paired electromagnets being disposed on the respective sides of the magneto-optical recording medium, wherein the paired electromagnets are arranged so that a line of magnetic force within each electromagnet is substantially parallel to a surface of the magneto-optical recording medium and respective lines of magnetic force between said electromagnets corresponding to each electromagnetic pole pair between the electromagnets are anti-parallel to each other.

15. A magneto-optical recording apparatus comprising:

an objective lens for focusing a light beam onto a magneto-optical recording medium; and a pair of electromagnets for applying a writing magnetic field onto a portion of the magneto-optical recording medium that has been irradiated by the light beam while applying an initializing magnetic field onto a portion apart from the portion irradiated by the light beam, the paired electromagnets being disposed on one side of the magneto-optical recording medium, wherein the paired electromagnets are arranged so that a line of magnetic force within each electromagnet is substantially parallel to the magneto-optical recording medium and respective lines of magnetic force between said electromagnets corresponding to each electromagnetic pole pair between the electromagnets are antiparallel to each other and are aligned symmetrically with respect to one another about an axis perpendicular to the magneto-optical recording medium and which passes through the portion irradiated by the light beam.

16. A magnet-optical recording apparatus as defined in claim 1, wherein said writing magnetic field is smaller in magnitude than said initializing magnetic field.

17. A magneto-optical recording apparatus as defined in claim 10, wherein said writing magnetic field is smaller in magnitude than said initializing magnetic field.

18. A magneto-optical recording apparatus as defined in claim 14, wherein said writing magnetic field is smaller in magnitude than said initializing magnetic field.

19. A magneto-optical recording apparatus as defined in claim 15, wherein said writing magnetic field is smaller in magnitude than said initializing magnetic field.

20. A magneto-optical recording apparatus as defined in claim 6, wherein said writing magnetic field is smaller in magnitude than said erasing magnetic field.

* * * * *